United States Patent
Agarwal et al.

(10) Patent No.: US 10,462,259 B2
(45) Date of Patent: *Oct. 29, 2019

(54) PROVIDING DIGITAL CONTENT BASED ON EXPECTED USER BEHAVIOR

(71) Applicant: Google LLC, Mountain View, CA (US)

(72) Inventors: Sumit Agarwal, Washington, DC (US);
Dipchand Nishar, Los Altos, CA (US);
Andrew E. Rubin, Portola Valley, CA (US)

(73) Assignee: Google LLC, Mountain View, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 15/677,512

(22) Filed: Aug. 15, 2017

(65) Prior Publication Data

US 2018/0027091 A1 Jan. 25, 2018

Related U.S. Application Data

(63) Continuation of application No. 13/905,712, filed on May 30, 2013, now Pat. No. 9,826,057, which is a continuation of application No. 13/616,699, filed on Sep. 14, 2012, now abandoned, which is a continuation of application No. 12/277,432, filed on Nov. 25, 2008, now Pat. No. 8,271,413.

(51) Int. Cl.
*G06Q 40/00* (2012.01)
*H04L 29/08* (2006.01)
*G06F 16/9535* (2019.01)
*G06F 16/9537* (2019.01)
*G06N 5/02* (2006.01)

(52) U.S. Cl.
CPC .......... *H04L 67/32* (2013.01); *G06F 16/9535* (2019.01); *G06F 16/9537* (2019.01); *G06N 5/02* (2013.01)

(58) Field of Classification Search
CPC ............... G06Q 30/02; G06Q 30/0255; G06Q 30/0247; G06Q 20/3224
See application file for complete search history.

(56) References Cited

U.S. PATENT DOCUMENTS

| | | | |
|---|---|---|---|
| 4,496,148 A | 1/1985 | Morstain et al. | |
| 4,825,045 A | 4/1989 | Humble | |

(Continued)

FOREIGN PATENT DOCUMENTS

| | | |
|---|---|---|
| CN | 1426529 A | 6/2003 |
| CN | 101147167 A | 3/2008 |

(Continued)

OTHER PUBLICATIONS

Chinese Office Action issued in Application No. 201510446336.5, dated Feb. 5, 2018, 15 pages.

(Continued)

*Primary Examiner* — Mike Anderson
(74) *Attorney, Agent, or Firm* — Fish & Richardson P.C.

(57) ABSTRACT

In a computing system, information regarding a plurality of events that use a computing device is obtained, and a time-dependant increase in activity for each of at least some of the events is identified. An observed interest by a user in an event is correlated with an identified increase in activity for the event. Information about the activity at a time related to the event is provided for review by the user.

20 Claims, 8 Drawing Sheets

(56) References Cited

U.S. PATENT DOCUMENTS

| | | |
|---|---|---|
| 5,442,788 A | 8/1995 | Bier |
| 5,596,373 A | 1/1997 | White et al. |
| 5,966,121 A | 10/1999 | Hubbell et al. |
| 6,018,699 A | 1/2000 | Baron et al. |
| 6,823,263 B1 | 11/2004 | Kelly et al. |
| 6,944,539 B2 | 9/2005 | Yamada et al. |
| 7,026,915 B2 | 4/2006 | Ohmura et al. |
| 7,080,018 B1 | 7/2006 | Fox et al. |
| 7,146,416 B1 | 12/2006 | Yoo et al. |
| 7,181,345 B2 | 2/2007 | Rosenfeld et al. |
| 7,190,960 B2 | 3/2007 | Wilson et al. |
| 7,383,130 B1 | 6/2008 | Koosam |
| 7,406,429 B2 | 7/2008 | Salonen |
| 7,610,208 B2 | 10/2009 | Salonen |
| 7,725,480 B2 | 5/2010 | Bassett et al. |
| 7,835,859 B2 | 11/2010 | Bill |
| 7,881,861 B2 * | 2/2011 | Kravets ............. G01C 21/3484 340/995.12 |
| 7,904,530 B2 | 3/2011 | Partridge et al. |
| 7,912,190 B2 | 3/2011 | Salonen |
| 7,937,380 B2 | 5/2011 | Spiegelman et al. |
| 8,024,111 B1 | 9/2011 | Meadows et al. |
| 8,027,877 B2 | 9/2011 | Crolley |
| 8,050,664 B2 | 11/2011 | Salonen |
| 8,051,452 B2 | 11/2011 | Arseneau et al. |
| 8,073,460 B1 | 12/2011 | Scofield et al. |
| 8,254,531 B2 | 8/2012 | Salonen |
| 8,260,330 B2 | 9/2012 | Salonen |
| 8,271,413 B2 | 9/2012 | Agarwal et al. |
| 8,326,630 B2 | 12/2012 | Chandrasekar et al. |
| 8,369,846 B2 | 2/2013 | Rosenblatt |
| RE44,073 E | 3/2013 | Salonen |
| 8,533,761 B1 | 9/2013 | Sahami et al. |
| 8,694,396 B1 | 4/2014 | Craner et al. |
| 2001/0044754 A1 | 11/2001 | Fujii et al. |
| 2002/0023010 A1 | 2/2002 | Rittmaster et al. |
| 2002/0038342 A1 | 3/2002 | Ito |
| 2002/0068585 A1 | 6/2002 | Chan et al. |
| 2002/0111154 A1 | 8/2002 | Eldering et al. |
| 2004/0003042 A1 * | 1/2004 | Horvitz ................ G06Q 10/109 709/204 |
| 2004/0083131 A1 | 4/2004 | Kaufman et al. |
| 2004/0128158 A1 | 7/2004 | Salonen |
| 2004/0128286 A1 | 7/2004 | Yasushi et al. |
| 2005/0038718 A1 * | 2/2005 | Barnes ................ G06Q 10/087 705/28 |
| 2005/0144069 A1 | 6/2005 | Wiseman et al. |
| 2006/0089160 A1 | 4/2006 | Othmer |
| 2006/0247060 A1 | 11/2006 | Hanson et al. |
| 2007/0001904 A1 | 1/2007 | Mendelson |
| 2007/0061195 A1 | 3/2007 | Liu et al. |
| 2007/0071209 A1 * | 3/2007 | Horvitz ................ G06Q 10/109 379/201.06 |
| 2007/0093235 A1 | 4/2007 | Kimbrell |
| 2007/0124290 A1 | 5/2007 | Swanson et al. |
| 2007/0179792 A1 | 8/2007 | Kramer |
| 2007/0203836 A1 | 8/2007 | Dodin |
| 2007/0206443 A1 | 9/2007 | Hwang et al. |
| 2007/0245020 A1 | 10/2007 | Ott |
| 2008/0091518 A1 | 4/2008 | Eisenson et al. |
| 2008/0133336 A1 | 6/2008 | Altman et al. |
| 2008/0154696 A1 * | 6/2008 | Spiegelman ............ G06Q 30/02 705/7.32 |
| 2008/0154725 A1 | 6/2008 | Flake et al. |
| 2008/0214157 A1 * | 9/2008 | Ramer .................. G06Q 10/00 455/414.1 |
| 2008/0306826 A1 | 12/2008 | Kramer et al. |
| 2009/0024452 A1 | 1/2009 | Martinez et al. |
| 2009/0077027 A1 | 3/2009 | King et al. |
| 2009/0150217 A1 | 6/2009 | Luff |
| 2010/0235251 A1 | 9/2010 | Salonen |
| 2011/0040625 A1 | 2/2011 | Woodruff et al. |
| 2011/0112965 A1 | 5/2011 | Salonen |
| 2011/0131286 A1 | 6/2011 | Salonen |
| 2011/0170678 A1 | 7/2011 | Salonen |
| 2011/0173017 A1 | 7/2011 | Salonen |
| 2011/0173278 A1 | 7/2011 | Salonen |
| 2011/0281595 A1 | 11/2011 | Salonen |
| 2012/0158590 A1 | 6/2012 | Salonen |
| 2012/0215695 A1 | 8/2012 | Salonen |
| 2012/0215696 A1 | 8/2012 | Salonen |
| 2012/0309437 A1 | 12/2012 | Salonen |
| 2012/0317029 A1 | 12/2012 | Salonen |
| 2012/0323789 A1 | 12/2012 | Salonen |
| 2013/0013545 A1 | 1/2013 | Agarwal et al. |
| 2013/0024493 A1 | 1/2013 | Salonen |
| 2013/0030994 A1 * | 1/2013 | Calman ................. G06Q 30/02 705/40 |
| 2013/0262362 A1 | 10/2013 | Agarwal et al. |
| 2013/0262631 A1 | 10/2013 | Agarwal et al. |
| 2013/0268625 A1 | 10/2013 | Agarwal et al. |
| 2015/0348146 A1 * | 12/2015 | Shanmugam ...... G06Q 30/0603 705/71 |

FOREIGN PATENT DOCUMENTS

| | | |
|---|---|---|
| EP | 1551195 | 7/2005 |
| JP | S63-034696 | 2/1988 |
| JP | 2000-306007 | 11/2000 |
| JP | 2001-175761 | 6/2001 |
| JP | 2002-108918 | 4/2002 |
| JP | 2002-251555 | 9/2002 |
| JP | 2003-99459 | 4/2003 |
| JP | 2005-315885 | 11/2005 |
| JP | 2007-060368 | 3/2007 |
| JP | 2008-123317 | 5/2008 |
| KR | 10-0447526 | 9/2004 |
| KR | 20050073126 | 7/2005 |
| KR | 10-0761398 | 9/2007 |
| WO | 200181870 | 11/2001 |
| WO | 2004/084109 | 9/2004 |
| WO | 2006/071648 | 7/2006 |
| WO | 2009/015370 | 1/2009 |

OTHER PUBLICATIONS

Korean Notice of Allowance issued in Application No. 10-2017-7032157, dated Jun. 29, 2018, 3 pages (with English translation).

U.S. Appl. No. 13/905,712, filed May 30, 2013.

U.S. Appl. No. 13/616,699, filed Sep. 14, 2012.

U.S. Appl. No. 12/277,432, filed Nov. 25, 2008.

International Preliminary Report on Patentability in International Application No. PCT/US2009/065682, dated Jun. 9, 2011, 7 pages.

International Search Report & Written Opinion in International Application No. PCT/US2009/065682, dated Feb. 19, 2010, 13 pages.

Ali and van Stam, "TiVo: Making Show Recommendations Using a Distributed Collaborative Filtering Architecture," *International Conference on Knowledge Discovery and Data Mining*, Proceedings of the 10$^{th}$ ACM SIGKDD KDD '04, Aug. 22-25, 2004. pp. 394-401.

Altman et al. "Location-based advertising message serving for mobile communication devices," abstract, 2012 (date of abstract), 1 page.

Giraud. "System for tracking consumer exposure and for exposing consumers to different advertisements," abstract, 2012 (date of abstract), 1 page.

Saxe. "Method and system for selectively targeting advertisements and programming," abstract, 2012, (date of abstract), 1 page.

Japanese Office Action in Japanese Application No. 2011-537704, dated Oct. 1, 2013, 7 pages.

Japanese Office Action in Japanese Application No. 2014-085589, dated Mar. 23, 2015, 9 pages (with English translation).

Korean Office Action in Korean Application No. 10-2011-7014843, dated Oct. 19, 2015, 17 pages (with English translation).

* cited by examiner

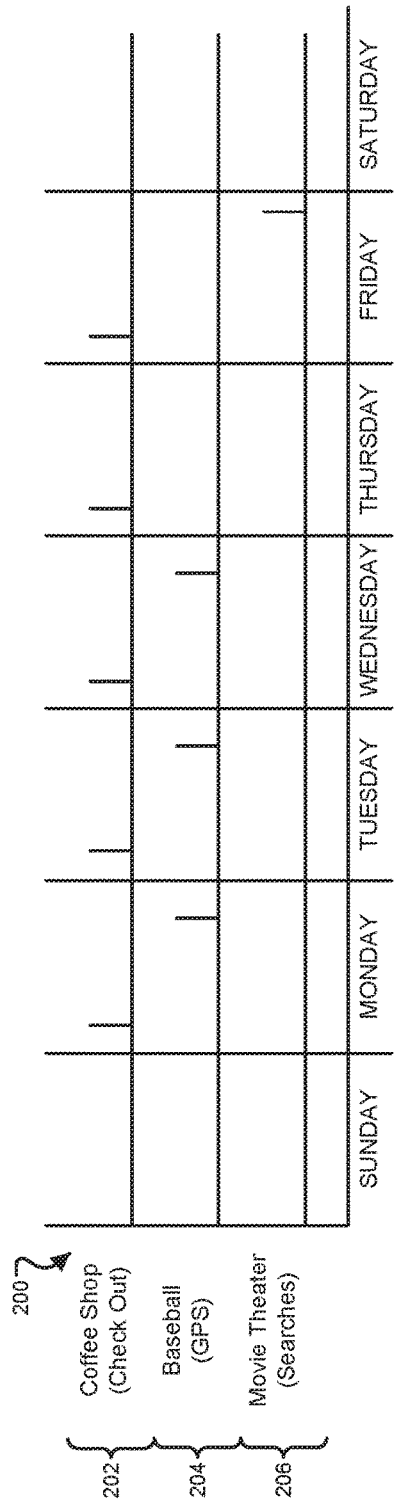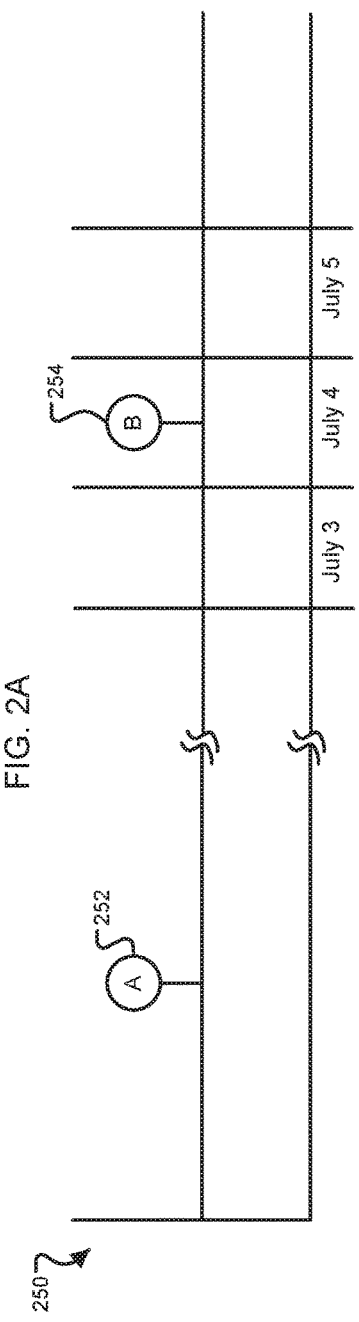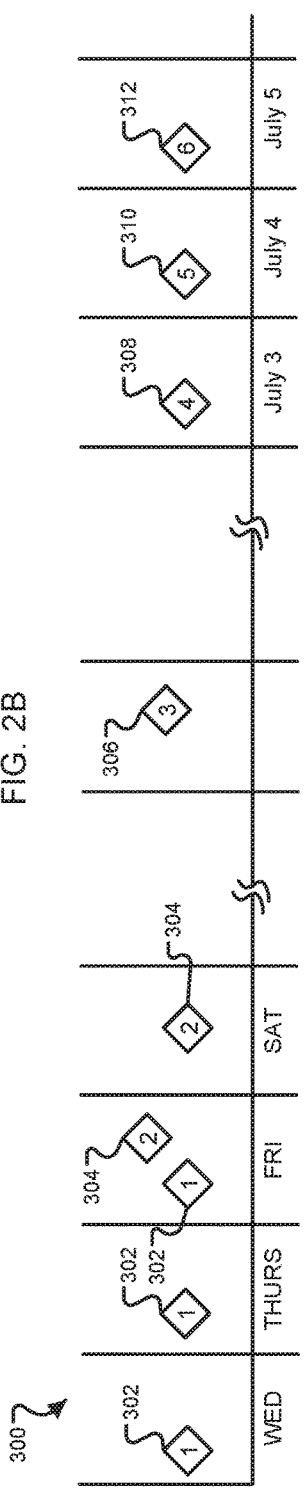

PROVIDING DIGITAL CONTENT BASED ON EXPECTED USER BEHAVIOR

CROSS REFERENCE TO RELATED APPLICATION

This application is a continuation application of, and claims priority to, pending U.S. application Ser. No. 13/905,712, filed on May 30, 2013, entitled "Providing Digital Content Based On Expected User Behavior,", which is a continuation of, and claims priority to, abandoned U.S. patent application Ser. No. 13/616,699, filed on Sep. 14, 2012, entitled "Providing Digital Content Based on Expected User Behavior," which is a continuation of, and claims priority to, issued U.S. patent application Ser. No. 12/277,432, filed on Nov. 25, 2008, entitled "Providing Digital Content Based on Expected User Behavior" (U.S. Pat. No. 8,271,413). The disclosure of the foregoing applications are incorporated herein by reference in their entirety.

TECHNICAL FIELD

This disclosure relates to providing digital content based on predictive determinations that are made in response to observations of user behavior.

BACKGROUND

As the speed of computing devices has increased, so have the demands that users of the devices place on them. Also, advancements in semiconductor design have led to smaller devices that consume less power, making it more practical for users to carry such computing devices with them throughout the day. For example, users of mobile computing devices, such as cellular phones, portable email devices, smartphones, and personal digital assistants, may demand that a single portable device be capable of performing multiple functions, and may expect to use the device for various tasks as they go about their daily lives.

Mobile devices may be used to request information such as stock quotes, movie listings, or driving directions, and may receive the information from one or more external servers, to which the devices may be communicably connected over a network. The external servers may provide the information to the mobile devices, which may then present the information to the mobile device users. Other presented information can include search results in response to a search request from the user.

In one example, a single mobile device may be used for placing or receiving phone calls, checking emails, viewing video data, listening to audio data, text messaging, and browsing the Internet. In some examples, the mobile device can also be used to perform a business transaction, such as purchasing a sandwich in a local restaurant. For example, a user of the mobile device may dial a specific number to initiate a monetary transfer from a user account to a restaurant account.

SUMMARY

Methods and systems are described for providing digital content based on predictive determinations that are made in response to observations of user behavior.

In a first general aspect, a computer-implemented method includes obtaining information regarding a plurality of events that use a computing device, and identifying a time-dependant increase in activity for each of at least some of the events. The method also includes correlating an observed interest by a user in an event with an identified increase in activity for the event. The method further includes providing, for review by the user, information about the activity at a time related to the event.

In various implementations, the events may be selected from a group consisting of a television program, a movie, a shopping transaction, and a musical song. Identifying the time-dependant increase in activity for each of the events may include analyzing search requests related to the event. Identifying the one or more time-dependant increases in activity for each of the events may include identifying a location, or identifying a sales transaction. The observed interest by the user may include a received user profile, or an inferred user profile. The one or more time-dependant increases in activity for the event may relate to timing of a transaction. Correlating an observed user interest may include supplementing information about the time-dependent increase in activity with data from an user identifying an explicit user preference for information about the activity. The method may further include correlating the observed interest by the user in the event with information reflecting occurrences of first non-user-specific events having an event type, and providing the information about the activity upon the occurrence of a non-user-specific event having the event type. The method may further include identifying a lack of correlation between the observed interest of the user and second non-user-specific events, and identifying the information based on a combination of the correlation and the lack of correlation.

In a second general aspect, a recordable media having recorded and stored thereon instructions that when executed on a computing device perform actions, including obtaining information regarding a plurality of events that use a computing device, and identifying a time-dependant increase in activity for each of at least some of the events. The performed actions also include correlating an observed interest by a user in an event with an identified increase in activity for the event, and providing, for review by the user, information about the activity at a time related to the event.

In various implementations, the events may be selected from a group consisting of a television program, a movie, a shopping transaction, and a musical song. Identifying the time-dependant increase in activity for each of the events may include analyzing search requests related to the event. Identifying the one or more time-dependant increases in activity for each of the events may include identifying a location associated with each of the events.

In a third general aspect, a computer-implemented method includes obtaining information regarding a plurality of user-specific events corresponding to a computing device, and correlating the user-specific events with one or more non-user-specific events. The method also includes identifying an interest by a user of the device with one or more of the non-user-specific events using the information regarding the plurality of user-specific events, and providing, for review by the user, information about a future non-user-specific activity using the identified interest.

In various implementations, the information may include promotional information for the non-user-specific activity, or promotional information for an entity in a geographic vicinity of the non-user-specific activity.

In a fourth general aspect, a computer-implemented system includes a first interface arranged to gather information regarding a plurality of events corresponding to a mobile computing device. The system also includes an observation module to identify a time-dependant increase in activity for each of at least some of the events, and a prediction module to correlate an observed interest by a user in an event with an identified increase in activity for the event. The system further includes a second interface arranged to provide, for review by the user, information about the activity at a time related to the event.

In various implementations, the events may be selected from a group consisting of a television program, a movie, a shopping transaction, and a musical song. Identifying the time-dependant increase in activity for each of the events may include analyzing search requests related to the event. Identifying the one or more time-dependant increases in activity for each of the events may include identifying a location associated with each of the events.

The details of one or more implementations are set forth in the accompanying drawings and the description below. Other features, objects, and advantages will be apparent from the description and drawings, and from the claims.

DESCRIPTION OF DRAWINGS

FIGS. 2A-2B are timing diagrams showing examples of events and their occurrences with respect to time.

FIG. 3 shows examples of user information provided based on time-related user data.

Like reference symbols in the various drawings indicate like elements.

DETAILED DESCRIPTION

Figure 1:
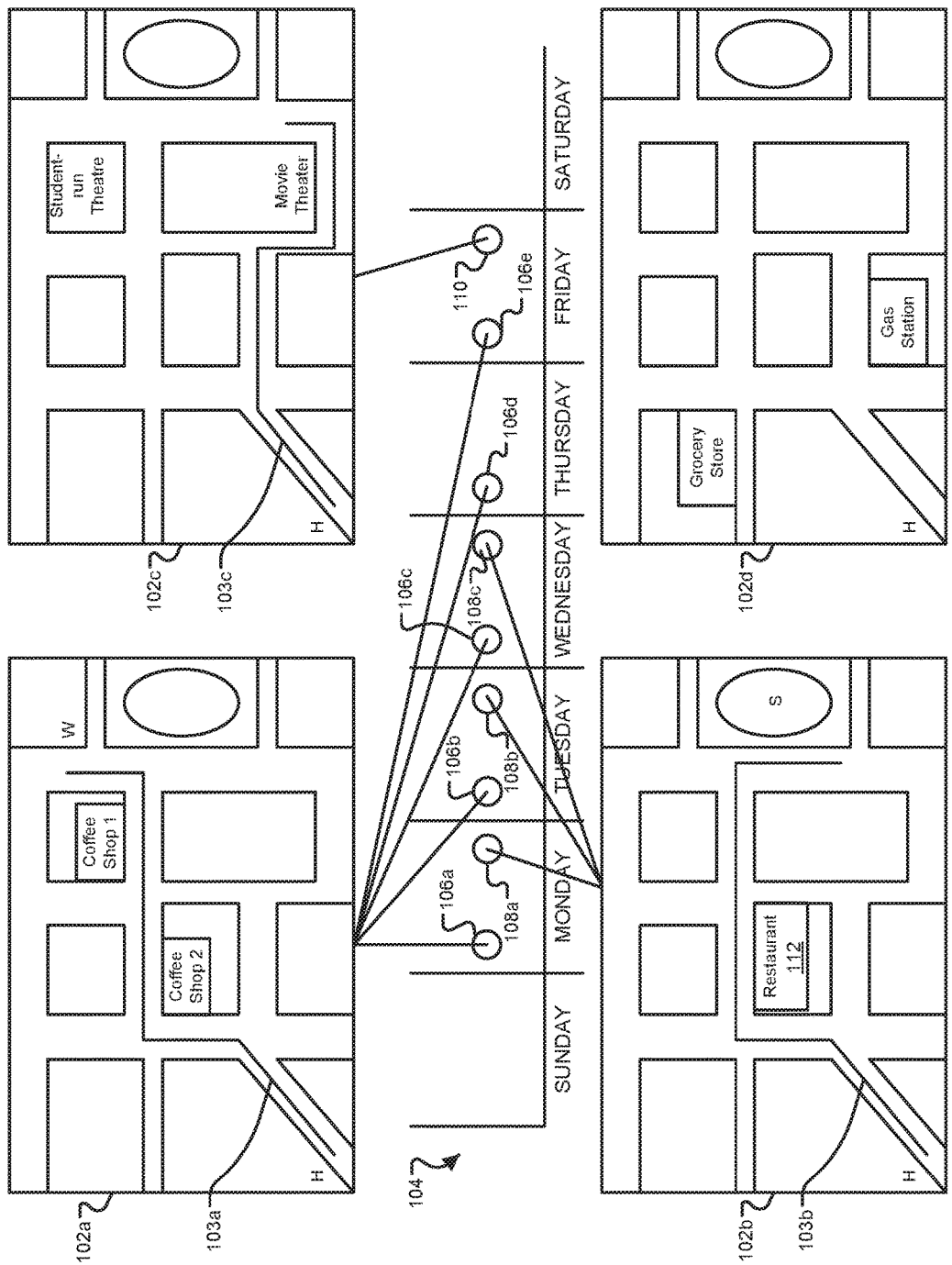
FIG. 1 is a schematic diagram showing maps of exemplary time-related routes.

Users of computing devices, such as a computer connected to the Internet, a mobile device (e.g., cellular phone, smartphone, or personal digital assistant (PDA) communicably connected to a network), a positioning device (e.g., global positioning system (GPS) device, which may be part of a mobile device), or an interactive video delivery system may tend to perform some activities in regular or semi-regular ways. To various degrees, the users may tend to live fairly structured lives, where they may perform some recurring or semi-recurring actions, or may engage in recurring or semi-recurring activities or events. These actions, activities, or events may tend to recur over various time periods (e.g., within a minute, within an hour, over several hours, during the course of a day, over a few days, a week, a month, a year, or over multiple years, etc.). For example, a user may generally drive from home to work each weekday and may return home from work in the afternoon. Though occasionally the user may depart from this routine, such as by carpooling, taking a vacation or sick day, riding the bus, etc., in general, the user may typically follow the daily routine of driving to and from work. In other examples, a user may tend to golf, cycle, or go boating each weekend, attend a club meeting the first Tuesday of each month, or wash the car almost every Saturday morning.

Some activities may recur at particular intervals, such as each weekend or on one or more particular days of the week or month, but may additionally be correlated to another time interval, such as a season. For example, a golfer may tend to play golf at a local golf course (or one of several local courses, e.g.) each weekend (or many or most weekends) during the spring, summer, and fall seasons, but may tend to practice instead at an indoor driving range on weekends during the winter. In another example, a user may engage in activities that recur on an annual basis, bi-annual basis, or some other long-term recurring schedule. For example, the user may travel to visit family during Thanksgiving each year. In another example, a group of six couples may enjoy a tradition of getting together once every six months for dinner, drinks, and fellowship, and may alternate hosting the event such that each couple hosts an event once every three years. The systems, devices and methods described herein discuss using these tendencies to anticipate future actions and provide information, such as digital content delivered to the user's mobile computing device, that may be useful to the user.

While users are performing these activities, or at some time before or after performing the activities, the users may interact with their mobile or other computing devices. When these interactions occur, a system in communication with the mobile or other computing device may gather or otherwise obtain information related to the activities or events. In some cases, such information may be obtained based on a communication initiated by the user of the mobile device, such as a request for information, a selection, a command, an initiation of a transaction, and the like. Also, the system can obtain information not specifically related to a communication with the user (e.g., time of day, day of the week, season, calendar information, regional information, worldwide, national or local news or event information, alerts, warnings, and the like). This information may be obtained, for example, from a digital storage location within or outside the system, including information stored on a computing system communicably coupled to a communication network, such as a LAN, WAN, or the computers and networks that comprise the Internet.

The system may store the information, and may associate the information with a timestamp or other indication of when the interaction occurred or when the information was obtained. Such indications can be used to determine patterns of activity and can be referenced to assess whether information is current or dated. The system may use the collected information to identify a time-dependent increase in activity for at least some of the events. In some cases, increases in activity may indicate that the user is becoming more inclined to partake in the event or similar events, and may portend an increasing likelihood that the user may similarly partake in the future. In some cases, increases in activity may indicate a generalized increase in popularity of a particular action, event, or phenomenon, independent of specific user indications. The system may then correlate an observed interest by the user in an event with an identified increase in activity for the event, and may provide information about the activity to the user for review. In this fashion, a user may conveniently receive information that may be of use to the user without having to specifically or generally request such information.

In various implementations, the systems, devices, and methods described here can be used to learn user tendencies by observing external signals, and can be used to predict future user actions. In some implementations, appropriate digital content may be provided based on the user tendencies or predicted user actions. External signals that can be observed include user requests or communications made using a computing device (e.g., signals transmitted from the user's device or devices), and temporal or time-related information, including time-related information associated with actions of the user (e.g., the time that the user requested information using a mobile computing device) or time-related information independent of actions of the user (e.g., the dates and times that the television program "Law & Order" is broadcast, a basketball team's published schedule, the schedule of nights that a local dance bar will feature line dancing, etc.).

By correlating the external signals and the time-related information, for example, the systems, devices and methods described here can determine how the user may act in the future based on observed user activity, and can provide digital content or information to the user based on the determination. In some implementations, observed increases in activity may be used in the determination. Such increases in activity may be specific or general. For example, the system may observe that the user is interested in the television show "Law & Order" by observing external signals, such as search requests initiated from the user's mobile device that pertain to the show. Requests a user might make may include requests for episode information, character biography information, episode teasers, merchandise availability, ratings information, program scheduling information, episode or trailer download requests, ringtone or screen saver requests, and so on.

The systems, methods, and apparatuses described herein can be flexible, in that they may accommodate variations of user activity or preferences at various times, and may adapt to a user's steady, increasing or decreasing interest or engagement in particular activities or events (or inquiries or communications regarding the activities or events, e.g.). The determinations of variations of user preferences may be developed over time, as patterns of regular, semi-regular, or occasional user behavior are observed. In various implementations, such determinations may be made based on the user's normal day-to-day interactions with their mobile or computing devices. That is, the system may not rely on having received explicit user indications of preferences (or preferred activities, events, causes, associations, characteristics, habits, tendencies, settings and the like) as can typically be submitted or entered under a "preferences" view in some user interfaces of some program applications. Rather, the systems, devices, and methods can make determinations of user preferences and predict user actions, activities, events, needs, etc., based on information gathered in the course of the user's normal interactions, and optionally also based on external signals unrelated or only tangentially related to specific user interactions with the system, for example. In some implementations, such information may be supplemented by explicit user preferences, as described above, which may be used to further refine predictive determinations for providing appropriate content for a user in some implementations.

The system may present a wide variety of information to the user based on the determinations described. Examples can include advertisements, promotion information, news, event information, recommendations, reviews, directions, and the like. In this fashion, the user can be benefited by receiving information of interest at a relevant time, which may reduce or minimize later search efforts that the user might otherwise perform. As such, user resources, such as time and expended effort, for example, may be conserved, and user quality-of-life may be improved.

The information may be presented to the user at the time the determination is made, or may be stored for later presentation at an appropriate time, according to various implementations. The information may be in the form of graphical or textual data, audible data, video data, or combinations of the above. In some cases, the user may be alerted that content is available by various alert indications, including an audible alert (e.g., a beep, ringtone, recorded message, audio clip, etc.), a tactile alert (e.g., vibrating or pulsing of a housing of the device), or visual alert (e.g., light indicator or message screen indicator, etc.). Combinations of the above, and others, may also be used.

FIG. 1 is a schematic diagram showing maps 102a, 102b, 102c, 102d of exemplary time-related routes 103a, 103b, 103c. For example, each of the routes 103a, 103b, 103c may represent geographical information related to a user at a specific time or over a period of time (e.g., 8 a.m. on Monday, 5 p.m. on Wednesday, the period from 8:00 a.m. to 8:15 a.m. on Thursday, etc.), and may indicate a path traversed by the user over the period of time. Similarly, the routes 103 may provide an indication of actions that a user may regularly or semi-regularly perform, including providing information about actions that a user may be likely to perform in the future. Each of the maps 102a-d shows an area near a home (indicated by an "H" in each of the maps 102) of a user. For simplicity, the exemplary maps 102 in FIG. 1 depict a relatively confined area, but maps of any appropriate scope and/or granularity may be used in various implementations.

The first route 103a is an exemplary path that the user may traverse in traveling to work (indicated by a "W" in map 102a). The second route 103b shows an exemplary path that the user may follow to travel to a baseball stadium (indicated by an "S" in map 102b). The third route 102c shows an exemplary path that the user may follow to get to a movie theater. The fourth map 102d identifies a grocery store and a gas station near the user's home, without showing a path. Because no associated route is shown in the fourth map 102d, the map 102d may represent the user remaining at home. In the depicted examples, the maps 102a-d and/or routes 103a-c may be associated with a timeline 104.

The timeline 104 is a graph that presents time on a horizontal axis, where one week is shown in FIG. 1. The routes 103 can be correlated to the timeline 104, and can be represented in the timeline by events 106a-e, 108a-c, 110, depicted illustratively as circles in FIG. 1. Representative lines are shown linking a particular map 102 and associated route 103 with events in one or more timeline periods (e.g., days of the week) of the timeline 104. For example, events 106a-e represent the user commuting from home to work each weekday (Monday, 106a; Tuesday 106b; Wednesday 106c; Thursday 106d, Friday 106e) during the week, as represented by route 103a in map 102a. In similar fashion, events 108a, 108b, and 108c represent the user attending baseball games at the stadium on Monday, Tuesday, and Wednesday, respectively, and event 110 represents the user viewing a movie at the movie theater on Friday. Event position within a particular day in the timeline 104 may also be representative of time-related information. For example, it can be seen that event 106a occurred before event 108a on Monday because event 106a is shown to the left of event 108a in the timeline 104. While not shown in FIG. 1, each event may be associated with a timestamp or time period indication that identifies the time that the corresponding action occurred. Each of the events 106*a-e*, 108*a-c*, and 110 may represent a sample of user information obtained during a week represented by the timeline 104. In various implementations, timelines of any appropriate length of time may be used, and for a given user the system may maintain one or multiple timelines.

Time and route information may be generalized to increase the number of matches between and among events. For example, a day may be split into several periods, such as morning, mid-day, afternoon, and evening, so that events that occur during any such period will be considered to be common events, even if they differ somewhat in time. In a like manner, the locations of events may be classified primarily by their endpoints, so that limited deviations in paths between the endpoints will not prevent the events from being classified together. For example, if a user takes an alternative route for part of their commute one day, the event for that commute may be treated as being common with other commutes that used slightly different routes.

In some implementations, an information-providing system can obtain information related to the maps 102 or routes 103 and can use the information to determine or predict future user activity. In one example, the information-providing system can obtain information pertinent to the user and related to the routes 103 by associating the routes with the user. For example, the information-providing system can receive data from a GPS device that detects the paths in the routes 103*a-c*. In another example, an external computing system, such as a server hosting various applications (including, e.g., an application that provides driving directions or mapping capability), can determine the routes 103*a-c* by observing queries and results related to driving. In another example, the information-providing system can receive data from a payment processing service provider, which can be used to determine where and when the user stopped to purchase products. For example, the system may determine a location of a coffee shop where the user stopped to purchase coffee, or a location of a gas station where the user purchased gasoline. This information can be used to determine routes or predict user activity. In other examples, calendar information, such as appointments, meetings, schedules, etc., may be used to determine the routes 103*a-c*. In some implementations, a route may be determined based on one or more information requests pertaining to establishments along the route. Combinations of the above may also be possible.

A user may also be allowed to opt in or opt out of certain information collection. For example, the user may be allowed to determine when information will be collected, and their computing device may alert them when information is being collected. Also, the user may be permitted to set the type of information so that, for example, information on the user's search activity or locations is collected, but information about purchasing activities is not. Also, to help maintain privacy for the user, appropriate mechanisms may be used to ensure that certain information is handled only on the user's device, and not by a separate server, or that information is adequately anonymized or otherwise shielded (e.g., by hashing information where the actual value of the information is not key).

Using the obtained information, a system can generate the events 106*a-e*, 108*a-c*, and 110 by associating the routes 103 to the timeline 104. In this example, the route 103*a* is associated with weekday morning events 106*a-e*. The route 103*b* is associated with the Monday, Tuesday, and Wednesday evening events 108*a-c*, and the route 103*c* is associated with the Friday evening event 110. In some implementations, the system can receive information that is related to a time. For example, the payment processing service provider can provide a location where the user purchased a product as well as a time when the user purchased the product. By associating the purchase events with the time, the system can generate an event in the timeline 104. In some implementations, the system can associate received data with a reception time. For example, the GPS device can transmit user travel data to the system in, for example, near real time. The information-providing system can generate a travel event in the timeline 104 that corresponds to the time when the travel data is received.

Based on the time-related information (for example, events in the timeline 104), the information-providing system can observe patterns of the user's behavior associated with time, and can use the observed information to make predictions of future user behavior and provide content accordingly. In one example, the events 106*a-d* may be related to purchasing of coffee in a first coffee shop (labeled "Coffee Shop 1" in the map 102*a*), such as if the user makes a habit of stopping at Coffee Shop 1 to purchase an espresso each morning before arriving at work. In some implementations, the system can correlate the events and the times of the events to observe a user behavior pattern. For example, one user behavior pattern may include purchasing coffee on weekday mornings, as described above. In various implementations, events may be sub-divided to include additional information. For example, the user may follow the route 103*a* depicted in map 102*a* each weekday on the way to work, but may only stop at Coffee Shop 1 on Monday, Tuesday and Friday, for example. In this case, events 106*a*, 106*b*, and 106*e*, corresponding to those days when the user stopped for coffee, may include a sub-event indicative of the coffee stop, while events 106*c* and 106*d* may not.

Using observed or determined patterns, the system can determine appropriate information for presentation to the user at a relevant time. For example, the system may use the observed information that the user enjoys a morning coffee before work, and may present a coupon from Coffee Shop 1, or from another coffee shop (e.g., "Coffee Shop 2") located along the route 103*a* usually traveled by the user to work on a weekday morning. In an example, the system may present the information to the user shortly before the user typically departs from home for work, for example. The user may appreciate this information, because it may be tailored to a preference of the user (e.g., the user's enjoyment of coffee on weekday mornings), and because it may be delivered or presented in a time-opportunistic fashion (i.e., near the time when the user often purchases coffee). As such, the user may save money or time with little or no additional effort expended in obtaining the promotion information.

In some implementations, the system can use information indicative of a first user pattern and information from an external signal to present the user with information at a time outside of a time associated with the pattern. For example, suppose the user in the example above is driving about town on a Saturday morning at 9:00 A.M. The system may use the observed information pertaining to the user's weekday coffee purchases (that is, associated with a pattern of activity occurring on weekday mornings), and may use the external signal that the user is presently driving in the morning (albeit on a Saturday) to present content associated with a coffee shop, such as a coupon for a free bagel with the purchase of a medium or large mocha. One or more additional external signals, such as the user's present location, calendar information, mobile device communications or requests, etc., may further be used to tailor content for presentation to the user, including for example presenting a coupon for a nearby coffee shop.

In certain implementations, the information-providing system can also present time-related user information based on a combination of global information and an observed pattern. As an illustrative example, the system can observe that the user traveled to the stadium the evenings of Monday, Tuesday, and Wednesday based on events 108a-c. In one example, the system can determine that baseball games are held in the stadium at a time near the occurrence of the events 108a-c by accessing global information, such as the baseball team's schedule, which may be stored in a server and available on a web page, for example. For example, the system may determine that the team plays home games at the stadium and may access the team's schedule from a team or league web site. In various implementations, the system can request that the user upload a game schedule for the baseball team, or send a query to a search engine to search for results relating to the team and its schedule, or access the baseball team's website to obtain the schedule. The system can use the user-related information (traveling to the stadium on Monday, Tuesday and Wednesday), combined with the global information or external signal (that a baseball game was played at the stadium each of those nights), to determine that the user likely attended baseball games at the stadium each of Monday, Tuesday, and Wednesday nights.

Such a determination might indicate any of several meanings. For example, it may indicate that the user is a full or partial season ticket holder for the baseball team, and that the user may be likely to attend many future games at the stadium. Such an indication may be bolstered if the user continues to attend baseball games at the stadium on a regular or semi-regular basis, or if external signals are observed that indicate an interest in the local baseball team (e.g., using one's mobile device to check league standings or read articles on the team). Alternatively, if each of the games that the user attended were against a common opponent, it may instead indicate that the user is a fan of the opponent, rather than the local team, and may portend that the user is likely to attend future games at the stadium when the opponent visits, but may be less indicative that the user will attend games when other opponents come to town. Such an indication may be bolstered if the user never or rarely attends baseball games involving other opponents, attends future games involving the same opponent, or exhibits observable behavior indicating an interest in the opponent baseball team.

By combining the global information (e.g., the baseball team schedule) and the events 108a-c, the system can observe a pattern that indicates that the user may be likely to attend many or all of the upcoming baseball games scheduled at the stadium. In some examples, the system may use the pattern to predict that the user will attend the next-scheduled baseball game, which may be determined from the team's schedule. Based on the prediction, the system can present relevant time-related user information for user review at an appropriate time. For example, the system may retrieve a date and time of the next baseball game by accessing the global information. Then, the system can, for example, present dining information for a restaurant located near the stadium, or along or near a route that the user may be likely to travel from home to the stadium. Such information may be presented, for example, two hours prior to the baseball game, so that the user may have an opportunity to receive the information and use it accordingly. For example, with reference to map 102b, the system may present a coupon or selected menu item information for restaurant 112, which is along the observed route 103b that the user has previously taken to the stadium. As another example, the system may present promotional information during the game for a bar or tavern near the stadium (not shown in FIG. 1) that is a popular after-game meeting place.

In certain implementations, the information-providing system can also determine user preferences based on detected events. For example, the system may observe that the event 110, visiting a movie theater on Friday evening, occurred even though a baseball game was concurrently being played in the stadium. This may indicate, for example, that the user prefers seeing a movie on Friday nights to attending a baseball game, even if the user may have previously purchased tickets for the baseball game (e.g., if the user is a season ticket holder). In certain implementations, the system can determine that the user prefers to go to the movie theater rather than watch baseball on Friday nights. This may distinguish Friday evenings, for example, because the user selected baseball over movies during the other days (e.g., Mon., Tues., Wed., as described above) where both choices were available. Based on the user preference, the system may provide movie-related information instead of baseball-related information on Friday evenings when both activities are scheduled, even though another user-observed pattern (associated with events 108) may have indicated that the user attends many or most baseball games played at the stadium. For example, the system can present movie schedule information, movie trailers, advance-ticket-purchase information, 2-for-1 buttered popcorn promotions, and the like, at 6:00 P.M. on Friday evening, in anticipation that the user will again choose to attend a movie on Friday evening over a baseball game. Similarly, the system may present information on events similar to movies (e.g., a musical play) that may be occurring in a nearby venue (e.g., in a student-run theatre near the movie theater) for user review on Friday evening. In some cases, the system may present information related to the baseball game and information related to movies on Friday evening, given the user tendencies described above.

In certain implementations, the information-providing system can also present user information based on a global user profile. As an illustrative example, the system can observe that a significant portion of users tend to shop for groceries and refill their vehicles with gas during weekends. In some implementations, the system may present the user with information related to grocery stores or gas stations (e.g., advertisements, coupons, promotions, locations or directions) near the user's home, as shown in the map 102d, during weekend periods. Such global information can be combined with observed user tendencies in various implementations, or may be used independently to predict user behavior and provide appropriate content accordingly.

By determining time-related information to be presented to the user, the system can anticipate information to be transmitted to the user's presentation device. In some implementations, the system can transmit the information at a time that improves the user's experience. In one implementation, the system can store the information in the user's device sometime prior to the determined presentation time. For example, the system can generate relevant information (e.g., information on starting lineups for the day's baseball game, happy hour specials at nearby pubs, movies showing at the movie theater on Friday evening, etc.) and store the information locally on the user's device prior to the event. The system may pre-fetch information that the system expects the user to be interested in, and may store the information locally on the user's device. Alternatively, the system can transmit the information for presentation on the user's device at the determined presentation time.

FIGS. 2A-2B are timing diagrams 200, 250 showing examples of events and their occurrences with respect to time. Similar to the timeline 104 in FIG. 1, the timing diagrams 200, 250 present time on the horizontal axes. As shown in FIG. 2A, the timing diagram 200 shows user-specific events 202, 204, 206 during a week. Each occurrence of the events 202, 204, 206 is represented by a spike in the timing diagram 200 at a particular point in time along the diagram 200. In various implementations, events may be represented by database objects and each occurrence of an event may be represented by an instance of the database object. In the depicted example, event 202 is related to a purchasing event at a coffee shop. As shown, the timing diagram 200 indicates that the user made purchases each weekday morning at the coffee shop, in this example. Event 204 is related to attendance at a baseball game, and event 206 is related to viewing a movie in a movie theatre.

As described above, the system may observe indications of user behavior over any appropriate period of time (minutes, hours, days, weeks, months, years, etc.). In some examples, an information-providing system can observe user events on a daily basis. From the timing diagram 200, the system can determine user patterns for the events 202, 204, 206. Similar to the system as described in FIG. 1, the information-providing system can obtain information related to a user's activity. For example, the system can receive user purchasing information and determine that the user tends to purchase coffee at the coffee shop every morning during the week. In another example, the system can receive GPS or location-based data (or ticket-purchase information, merchandise or concession purchase information, parking ticket purchase information, search requests, communications, and the like) that indicates that the user tends to attend baseball games on Monday, Tuesday, and Wednesday evenings that coincide with games scheduled on those days. In another example, the system can determine from search queries that the user often visits the movie theater on Fridays. In some implementations, the system can also observe user events in other time periods. For example, the system may observe the user events over a period of weeks to determine that the user goes to the movie theatre every Friday evening, or may observe user activity over a period corresponding to the baseball team's season (e.g., April through September) to determine activity patterns related to interest in baseball.

As shown in FIG. 2B, the timing diagram 250 shows two events 252, 254 (indicated by event A 252 and event B 254, respectively) that are not user-specific events. For example, event A 252 may correspond to global event involving a worldwide stock market scare, where several stock markets around the world may substantially decline in value concurrently or in succession. Event B 254 may be a regional event, such as the Independence Day holiday in the United States. These and other non-user-specific events may be used to provide users with appropriate time-related information, and may be used independently or in conjunction with observed user behavior information or other external signal information. In some implementations, the information-providing system may store the events 252, 254 in a data store. By combining the events 252, 254 with users' profiles determined based on observed behavior or preferences, the system can present time-related information to users, as will be described more fully below.

FIG. 3 shows examples of user information provided based on time-related user data. A timing diagram 300 includes nodes 302, 304, 306, 308, 310, 312. Each of the nodes 302, 304, 306, 308, 310, 312 represents a presentation event of user information. In the depicted example, the nodes 302 may represent presentations of coupons for a coffee shop. The node 304 may represent, for example, a presentation of an advertisement for a restaurant near the baseball stadium or near the movie theater. The node 306 may represent presentation of information related to the stock market. The node 308, 310, 312 may represent presentation of information related to Independence Day. Information may be presented in various manners. For example, the information may be displayed on an output device, such as a display device, of the user's mobile computing device. The information may be of any suitable form, including visual, audible, tactile, etc.

Based on the user-specific events 202, 204, 206 and the global events 252, 254, the information-providing system can generate user information (e.g., advertisements, promotional material, news articles, recommendations, and the like) and present the user information to the user at a relevant time. In this example, the system can observe the user's activities on the first two days of the week (Mon., Tues.) and determine a user behavior pattern. In various implementations, the system can use determined patterns to forecast user activity for future periods. In this case, the system can use determined patterns to predict user activity for the rest of the week. For example, the system can predict that the user tends to purchase coffee on weekday mornings based on the instances of event 202 on Monday and Tuesday morning (see FIG. 2A), so the system may present coupons for the same or a competing coffee shop each of the remaining weekday mornings (the nodes 302).

In another example, the system may observe that the user may be a season ticket holder for the local profession baseball team. The system can retrieve a schedule of the baseball games and present restaurant information (e.g., dinner menu/lunch menu) at a time before or after each of the baseball games. As shown, information for the restaurants near the stadium is presented based on the baseball game schedule. For example, the information can be presented on a Friday evening when a Friday night game is scheduled. Similarly, the information may be presented at noon on Saturday to coincide with a Saturday afternoon game.

In some examples, the system can detect that the presented information was not useful for the user. In some implementations, the system can assess usefulness of presented information by detecting whether the user reviews the information, uses the information, or performs a predicted activity. For example, the user may not go to the baseball game on Friday evening as predicted, and instead may go to a movie theater. In some examples, the system can detect that the node 304 presented on Friday evening may not be useful because the user did not review the information or use the information (e.g., if the user did not use a presented coupon). In some cases, the user may provide direct feedback concerning presented information, such as whether particular information or classes of information was useful or not. Assessments of presented information's effectiveness or usefulness can be used to better tailor future information presentation to the user. Also, such information can be used to update predicted user behavior patterns or expectations. In certain implementations, the system can update the user's behavior pattern based on the detected information. For example, the system can update the user's behavior pattern to reflect a user preference for movies over baseball on a Friday evenings.

In some implementations, the system can identify increases or decreases in user activity related to events. Using the increase or decrease in activity, the system can correlate user interests in each of the activities. In some examples, the system can present more related information based on an increasing frequency of an activity. For example, suppose that the baseball team is having an excellent season, and that as a result the user begins forgoing Friday night movies to attend the games. The system may note the change in behavior, and may alter the presentation of information accordingly. For example, the system may observe indications of the user attending one or more Friday night games and not attending Friday night movies. The system may also observe an increase in external signal activity involving the baseball team. These and other indications may be used to determine the change in user behavior patterns, and predictive assessments may be correspondingly adjusted.

Conversely, if the team begins to struggle, the user may elect against attending some games, even those not falling on Fridays. Suppose further that the user begins to show an increased interest in golf, and plays a series of rounds after work over a period of days or weeks. In some examples, the system can correlate the increased interest in golf with the decreased interest in baseball, and present more golf-related information (e.g., discounts on golf equipment, coupons for reduced greens fees, etc.) while presenting less baseball-related (or stadium-related) information. For example, the system can decrease presentation of restaurant information near the stadium, and replace it with presented information related to the user's substitute activity, golf in this example.

Referring again to FIG. 3, the system can also present the node 306 in response to non-user-specific events. In one example, the information-providing system can present information in response to a global event, such as a global stock market correction. For example, the system can present information about investments, such as safer financial products or particular securities that may now be attractively priced, broker information, and the like, during the market correction. In some implementations, the system can also identify other local, national, or global events, such as a local weather alert, a natural disaster (e.g., earthquake, tornado, tsunami, etc.), or a political warning (e.g., riots in country X, presidential assassination in country Y). Based on the event information, the information-providing system can provide timely information to the users. For example, in conjunction with the first winter storm warning of the season, the system may present information pertaining to snow tires that may be appropriate for the user's vehicle. The information may include sale information for tires available at a tire dealer along a route that the user is expected to traverse, or which may be near the user's present location, or which may be near the user's home or workplace, for example.

In some implementations, the system can provide information based on a user profile. For example, the user profile may include one or more locations, occupations, interests, etc., and may be determined by observing the user's normal day-to-day activities, such as by observing the user's daily interactions with a mobile device.

The information-providing system can also provide information based on information gathered from multiple users. For example, nodes 308, 310, 312 may be generated based on time-related preferences of more than one user. The information-providing system may observe a spike in user preferences for events related to the event 254 (the Independence Day holiday). In an implementation, because of a general increase in activity among other users with respect to a certain activity or event, the system may present information to the user concerning the activity or event because the system may predict that the user may be similarly interested in such information.

Based on the observation, the system may present advertisements for fireworks on July 3rd (the node 308), fireworks displays information or concert information on July 4th (the node 310), and car dealer extended sale information on July 5th (the node 312). Based on user profiles, the system may present different information to the users. For example, the system may only present fireworks show information for shows occurring within 20 miles of a user's home. As another example, the system may not present any July 4th Independence Day information if the user is a Russian citizen living in Moscow, as such a user would likely have no interest in such information.

Information can be presented in anticipation of an expected action or in response to an observed action. For example, suppose that a baseball game is scheduled for a Thursday evening in June, and that the system has determined that the user is likely to attend the game at the stadium. Suppose that the weather forecast calls for a dangerous thunderstorm for that evening. The system may present a weather warning to the user prior to game time, which may include a suggestion to pack an umbrella if planning to attend the game. Later, if the storm materializes and intensifies to include a tornado warning during the game, the system may present information that describes tornado shelter locations within the stadium, for example. In one example, such a message may only be presented if the system determines that the user is in attendance at the game. The message may consider the user's seating location in the stadium and may provide walking directions from the user's seating location to the shelter area.

Preexisting connections between event types may be used to provide such information to a user. For example, events at an outdoor venue may be assigned a connection with weather, where the location of the venue is a parameter for the connection. As a result, when a user is associated with an event at the venue, the various events that are associated with the venue may be checked, such as by checking whether for the geography around the venue (e.g., centered around an address determined to be associated with the venue).

Figure 4:
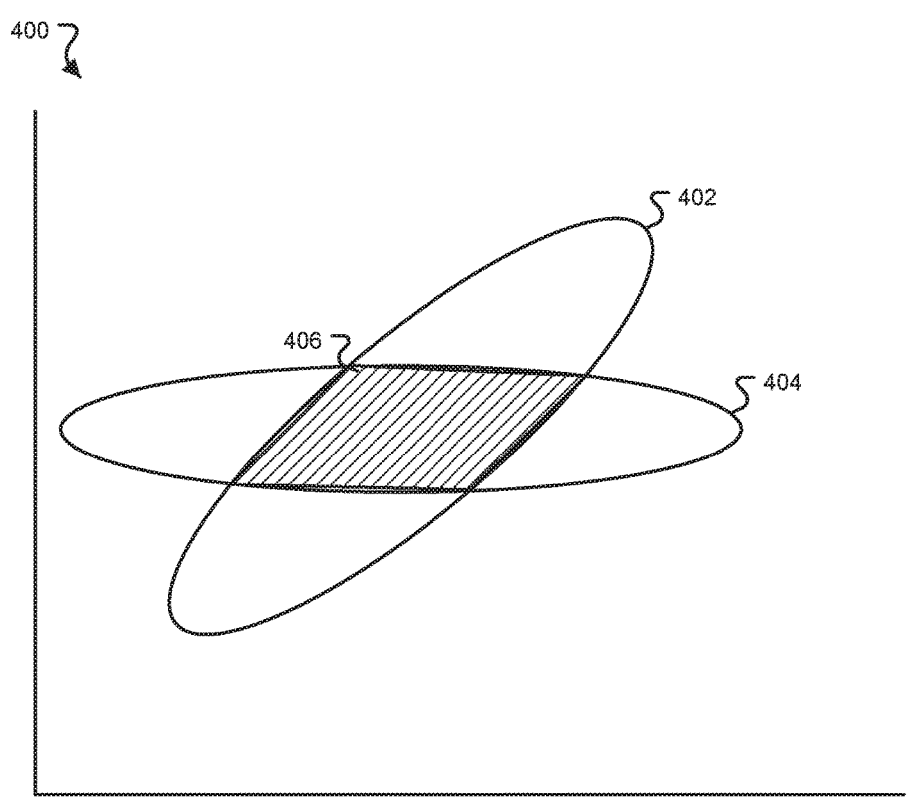
FIG. 4 is an exemplary set diagram that includes two information sets and their intersection.

FIG. 4 is an exemplary set diagram 400 that includes two information sets 402, 404 and their intersection 406. The information sets 402, 404 may include information eligible for presentation to a user (e.g., product information, service information, location information, promotional information, etc.). Based on the intersection 406 of the sets 402, 404, an information-providing system can select information to be presented to the user. The sets 402, 404 may represent information corresponding to two different events or to other such items.

In some implementations, the set 402 includes time-related information. The information-providing system can gather information by, for example, accessing external servers on the Internet or accessing a database. For example, the set 402 can include time-related activities related to a current time. In one example, if the current time is near Independence Day, then the system may gather information related to events occurring during Independence Day in the information set 402.

As an illustrative example, the set 402 may include time-related information related to a time period from July 3rd to July 5th. For example, the set 402 can include information on events such as parades, fireworks displays, baseball games, festivals, etc., and promotions (e.g., information on retailers having sales corresponding to the holiday period) that are occurring between July 3rd and July 5th. In an example, the set 402 can include coupons for a fireworks retailer offering discounts of 33% on July 3rd, 50% on July 4th, and 70% on July 5th.

The information set 404 includes user-specific information, such as the user's location of residence (e.g., Minneapolis, Minn.), user behavior patterns (e.g., user's tendency to get lunch at the burger joint two blocks from the user's workplace), user interests (e.g., the local professional baseball team, golf, boating, the stock market, World War II history books and videos), and other user-specific information. In some implementations, the set 404 can include information related to a user profile. For example, the information-providing system can gather information, such as user's interests, user's work information, user's behaviors, user's residential location, etc., from the user profile. Again, the information provided in such a manner may be controlled by, and limited by, the user.

In some implementations, the user profile can be constructed by receiving profile information from the user and/or observing user behaviors. In one example, the information-providing system can receive a user profile uploaded from a user indicating that the user lives in Minneapolis, Minn. In one example, the information-providing system can determine that the user is living in Minneapolis, Minn. by observing multiple search queries of restaurants in the Minneapolis area over a period of time, and/or observing other user behavior that indicates that the user resides in a particular area. In one example, the information provider system can determine that the user is located in Minneapolis based on GPS information.

In one example, the information-providing system can determine a user profile based on observed user behaviors. For example, the information-providing system can determine a user's preferences related to a particular event, such as Independence Day, based on the user's past behavior in relation to the event or to a similar event. For example, the set 404 can include information relating to the user's behavior for previous Independence Day holidays. As an example, the set 404 can include information relating to past activities of the user, such as watching fireworks on Independence Day after attending a baseball game, and purchasing fireworks on July 5th to get the best bargains.

In some implementations, the information-providing system can include information that is common to both sets 402, 404, symbolized in FIG. 4 by intersection region 406. Accordingly, the intersection region 406 may include information that is related to user preferences and to a time period of interest. In one example, the intersection 406 may include fireworks events after baseball games during July 3rd to July 5th near Minneapolis, Minn., because the user attended a firework display following a baseball game on Independence Day the year before. The intersection 406 may also include fireworks coupons on July 5th for stores near Minneapolis because the user purchased fireworks on July 5th last year.

Information can be presented to the user based on the intersection 406. In some examples, the system can present, at the beginning of a baseball game during the Independence Day weekend, information concerning fireworks events following the baseball game. As another example, the system can present the fireworks coupon information each morning on July 3rd, 4th and 5th to notify the user of the fireworks discounts that day or in the near future.

Figure 5:
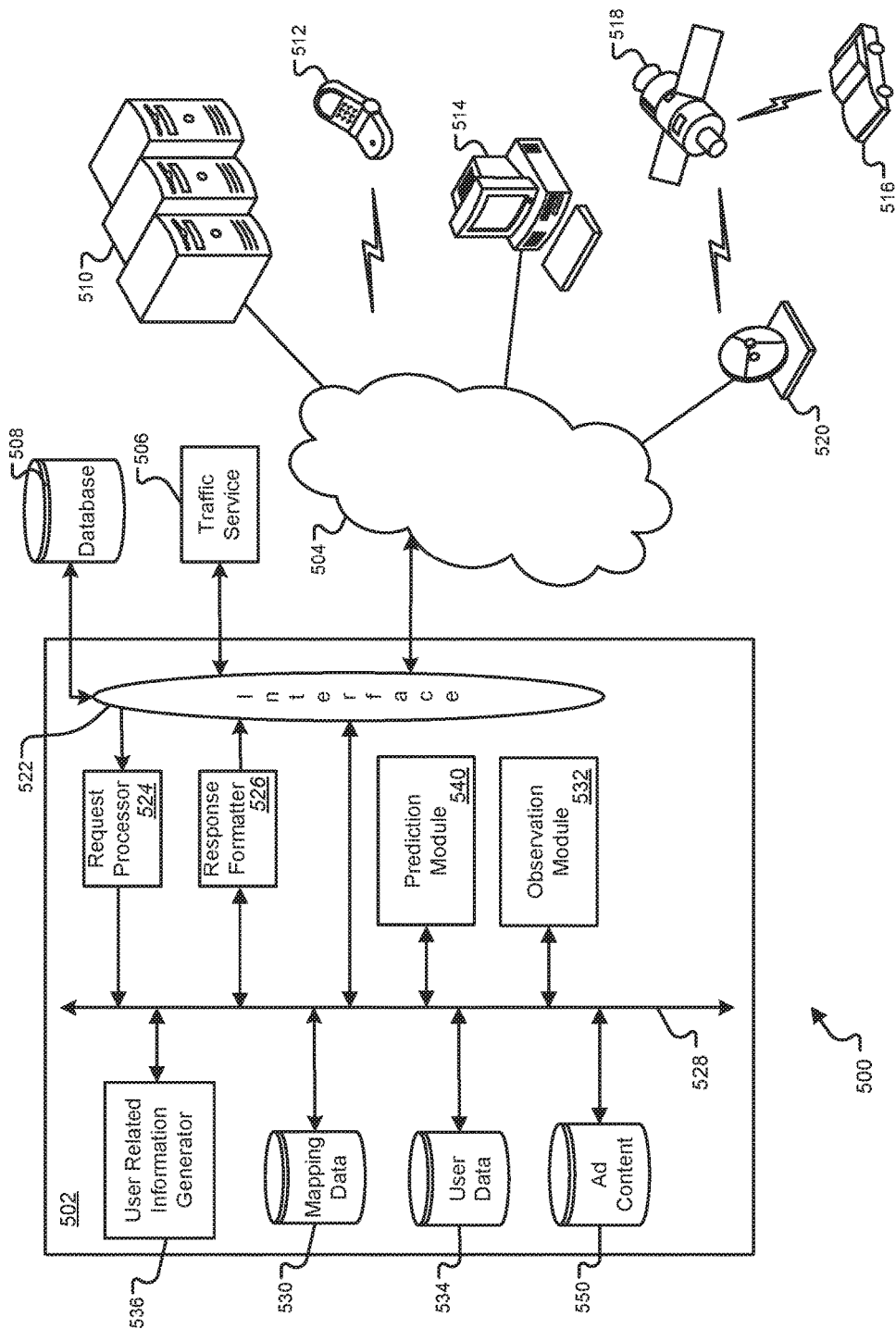
FIG. 5 is a schematic diagram of a system that can be used to present time-related user information.

FIG. 5 is a schematic diagram of an exemplary system 500 that can be used to present time-related user information. In one example, the system 500 can present user information based on observed user behaviors and predicted future user actions. In some examples, the system 500 can perform some or all functions described above with respect to FIGS. 1-4.

The system 500 includes an information-providing system (IPS) 502, a network 504, a traffic service module 506, and a database 508. The IPS 502 can communicate with the traffic service module 506 and the database 508. For example, the IPS 502 can request and receive traffic information (e.g., road closure information and traffic congestion information) from the traffic service module 506. For example, the IPS 502 communicates with the database 508 to retrieve information for a user. In one implementation, the database 508 can include user-related information, such as a schedule of the user's favorite baseball team, a list of local events near the user's location, and/or promotional information associated with the user's favorite stores, among others. In various examples, the databases 508 may be connected to the IPS 502 by a high bandwidth LAN or WAN. In some examples, the database 508 can be connected to the IPS 502 through the network 504.

Through the network 504, the IPS 502 is connected to one or more external servers 510, a mobile device 512, and a computing device 514. The external sever 510 can include, for example, a mapping server that provide routing information, a business directory server that provide business information (e.g., store information, restaurant information, etc.), and/or web servers that provide information about news items, current events, or various companies and organizations (e.g., the baseball team website that provides game schedule information). In some implementations, the IPS 502 can retrieve information from the external server 510 based on a user preference (e.g., a baseball game schedule based on user's interest in watching baseball). In some implementations, the external server 510 can also provide information to be stored in the IPS 502. For example, the external server 510 may provide business information, such as location information, operating hours, features, contact information, and/or promotional information for a business, to the IPS 502. In some examples, the IPS 502 may present the received business information to a user based on the user's preferences.

The mobile device 512 and the computing device 514 may be used by users of the system 500. In the depicted example, the mobile device 512 is shown as a cellular telephone handset for communicating with a user. For example, the mobile device 512 can communicate, via a cellular telephone network, with the IPS 502 using a Wireless Application Protocol (WAP) standard or other appropriate communication protocols. Other examples of the mobile device may be possible. For example, the mobile device 512 can be a personal digital assistant, a personal computer, or a voice-driven communication device. The mobile device 512 may include appropriate input and output structures, such as, for example, a display screen which may have a touch-sensitive surface, data entry keys, clickable data entry wheels, speakers, and a microphone, including for voice recognition.

In some implementations, the IPS 502 can gather information from and present information to a user using the mobile device 512. For example, the mobile device 512 can receive target information from the IPS 502. By displaying the target information, for example, the user of the mobile device 512 can review the target information. In some implementations, the mobile device 512 can present the target information in other formats. For example, the mobile device 512 can present the target information by playing audio data received from the IPS 502. In an example where the IPS 502 provides a coupon to the mobile device 512, the user may redeem the coupon in various ways. For example, the user may display the coupon to an attendant, who may honor the coupon. The user may use the mobile device 512 to send a communication to a computing device at the place of business associated with the coupon for redemption. Also, the display of the coupon (e.g., on a display screen of the device 512) may include a machine-readable representation that may be scanned for redemption of the coupon, to list just a few examples.

The computing device 514 may be a desktop computer, a set top box, or other device that can be connected to the network 504. In some implementations, a user of the computing device 514 may transmit queries (e.g., web search request, driving direction request, and/or dinning information request) to the IPS 502. For example, the computing device 514 may be connected to the Internet. The IPS 502 can observe user behaviors based on the received queries, and can determine user interest in various activities, events, or subject matter based on user requests or interaction with the system. In some examples, the IPS 502 can present time-related user information to the computing device 514. For example, the IPS 502 can present coupons for various coffee shops to the computing device 514. The user may print the coupons for later redemption, according to some implementations.

The system 500 also includes a vehicle navigation system 516, a satellite 518, and a base station 520. The navigation system 516 communicates through a satellite network via the satellite 518 and the base station 520. As shown in FIG. 5, the base station 520 is connected to the network 504 to communicate with the IPS 502. The user can use the vehicle navigation system 516 to obtain route information (e.g., driving directions). For example, a user of the vehicle navigation system 516 can transmit a request to the IPS 502 for route information. Upon receiving the request, the IPS 502 can provide the requested route information to the user, perhaps after first communicating with the database 508 or external server 510. In some implementations, the navigation system 516 can be used to gather location information (e.g., through a GPS system) and to display maps and other data. In some examples, the IPS 502 can also query the vehicle navigation system 516 for a current location of the vehicle navigation system 516. After receiving the current location, the IPS 502 can, for example, present target information (e.g., restaurants, gas prices, auto repair shop, etc., in the area) related to the current location of the vehicle navigation system 516. In some implementations, the mobile device 512 can include a GPS system, and can implement the features described above.

As described, the IPS 502 can receive requests from the devices 512, 514, 516. In an implementation shown in FIG. 5, the IPS 502 includes an interface 522 to receive requests from the devices 512, 514, 516. For example, the interface 522 can be a network interface, such as a network card. In some examples, the interface 522 is configured to transmit and receive data via the network 504. The interface 522 is coupled to the database 508 and the traffic service 506. For example, the IPS 502 can retrieve information from the database 508 and the traffic service 506 via the interface 522.

In some examples, the IPS 502 can also access the external server 510 to retrieve information via the interface 522 and the network 504.

In the depicted example, the IPS 502 includes a request processor 524 and a response formatter 526 to process user requests and generate responses to the user requests, respectively. The request processor 524 processes requests received by the interface 522. For example, the request processor 526 can parse a received request and format the request from a network message format (e.g., an HTML format or a text format) to a format usable by the IPS 502.

After formatting the received request, the IPS 502 obtains information required by the received request. In some examples, the IPS 502 may access the database 508, the traffic service module 506, and/or the external servers 510 to obtain the required information. For example, the IPS 502 may access the traffic service module 506 if the user requests traffic-related information. The IPS 502 also includes a mapping data repository 530. For example, the IPS 502 can access the mapping data repository 530 to obtain route information and other information related to a location or a destination of the user.

In the depicted example, the IPS 502 includes a data bus 528 that interconnects various components of the IPS 502. Through the data bus 528, the IPS 502 can transmit the obtained information to the response formatter 526. For example, the response formatter 526 can receive information from the mapping data repository 530 via the data bus 528. After receiving the information, the response formatter 526 formats the information in a format that can be used by the requesting device.

Based on the user requests and/or other types of received user communications or interactions, or other received user events, the IPS 502 can determine user preferences and generate a user profile related to the user preferences. In the depicted example, the IPS 502 includes an observation module 532 to determine the user preferences. For example, the observation module 532 determines the user preferences based on, for example, search requests received from the user, shopping transactions originated by the user, route information used by the user, selections made by the user, information requests, or other user activities. For example, the user events can be received from the devices 512, 514, 516.

In one example, the observation module 532 can determine a user preference by observing an increased frequency of user activity related to one or more events, activities, or subject matter categories. For example, the observation module 532 can determine a user preference for a TV program if the user frequently searches information (e.g., show time, characters, episodes description, and/or spoilers) related to the TV program. The observation module 532 can also detect increases in user activity, and can use the detected increases to refine the user profile or preferences.

After determining the user information, the IPS 502 stores the determined user preferences in a user data repository 534. In some implementations, the user data repository 534 can also store user profile data (e.g., address, occupation, interests, and other personal information) received from the user.

Based on information stored in the user data repository 534, the IPS 502 presents user related information to the user. In the depicted example, the IPS 502 includes a user related information generator (URIG) 536 to generate the user-related information. In some implementations, the URIG 536 can select information to be presented based on the user data in the user data repository 534. For example, the URIG 536 can present information (e.g., soundtrack, spoiler, or show time information) related to a particular TV program that the user is interested in.

In various implementations, the URIG 536 can generate user related information based on one or more associations common to the received user events. For example, the observation module 532 can collect a number of user events related to downloading of songs. In one example, the observation module 532 can generate associations with the downloaded songs based on associated categories, such as an artist or collection of artists associated with the songs, genres of the songs (e.g., rock, country, blues, classical, or hip-hop), and/or time periods when the songs were released (e.g., 1970s, 1980s, 1990s, etc.). In some examples, the observation module 532 can identify one or more user preferences by associating the downloaded songs and the associated categories. For example, the observation module 532 may determine that the user is interested in rock music from the 1980s. In some implementations, the determined user interest is stored in the user data repository 534. In some examples, the URIG 536 can present, based on the user interest in rock music from the 1980s, upcoming concert touring information for Bon Jovi, U2, or Guns N'Roses, rock bands that enjoyed popularity in the 1980s.

The URIG 536 can also use the prediction module 540 to generate time-related user information. For example, the prediction module 540 can generate predictive events by combining user related information and time-related information. In one example, the prediction module 540 can correlate search requests related to a TV program with the time the search requests were received. For example, suppose that a user submits a search request regarding episode information for "American Idol," and that the request is submitted shortly after the program finishes airing on a particular night. The next time the program is aired, the user may again submit a similar search request. In some examples, based on a relationship between the search request and the time of receiving the search request, the prediction module 540 can generate time-related information by predicting a next time when the user will request similar information. For example, the prediction module 540 can generate and store, in the user data repository 534 for example, a prediction that the user may request "American Idol"-related information the next time that the program is aired, or shortly thereafter.

Using the prediction generated by the prediction module 540, in one implementation, the URIG 536 can select and present time-related user information based on a user preference. The URIG 536 can select to present information such as a purchase offer for the TV program soundtrack before, during, or after the program airs, because, for example, the prediction may indicate that the user will likely view the TV program, and may be interested in receiving such a promotional offer at a time proximate the viewing of the show. In the example described in FIG. 1, the prediction module 540 may determine that the user will purchase a coffee each weekday morning. Based on the received prediction, the URIG 536 can retrieve information related to coffee shops near the travel route of the user from the database 508 and/or the external servers 510, and can present such information to the user at a relevant time, such as shortly before the user departs from home each weekday.

In some implementations, the URIG 536 can also select information from an ad content repository 550. For example, the ad content repository 550 includes ad content that can be presented to the user based on user interests. For example, the ad content repository 550 can include promotion information (e.g., coupons) for coffee shops, given the user's observed interest in morning coffee. In one example, the URIG 536 may select coupons from a coffee shop near a user's route to work on weekday mornings, or links for purchasing a soundtrack compact disc of a TV program within thirty minutes after the program finishes airing on television.

Figure 6:
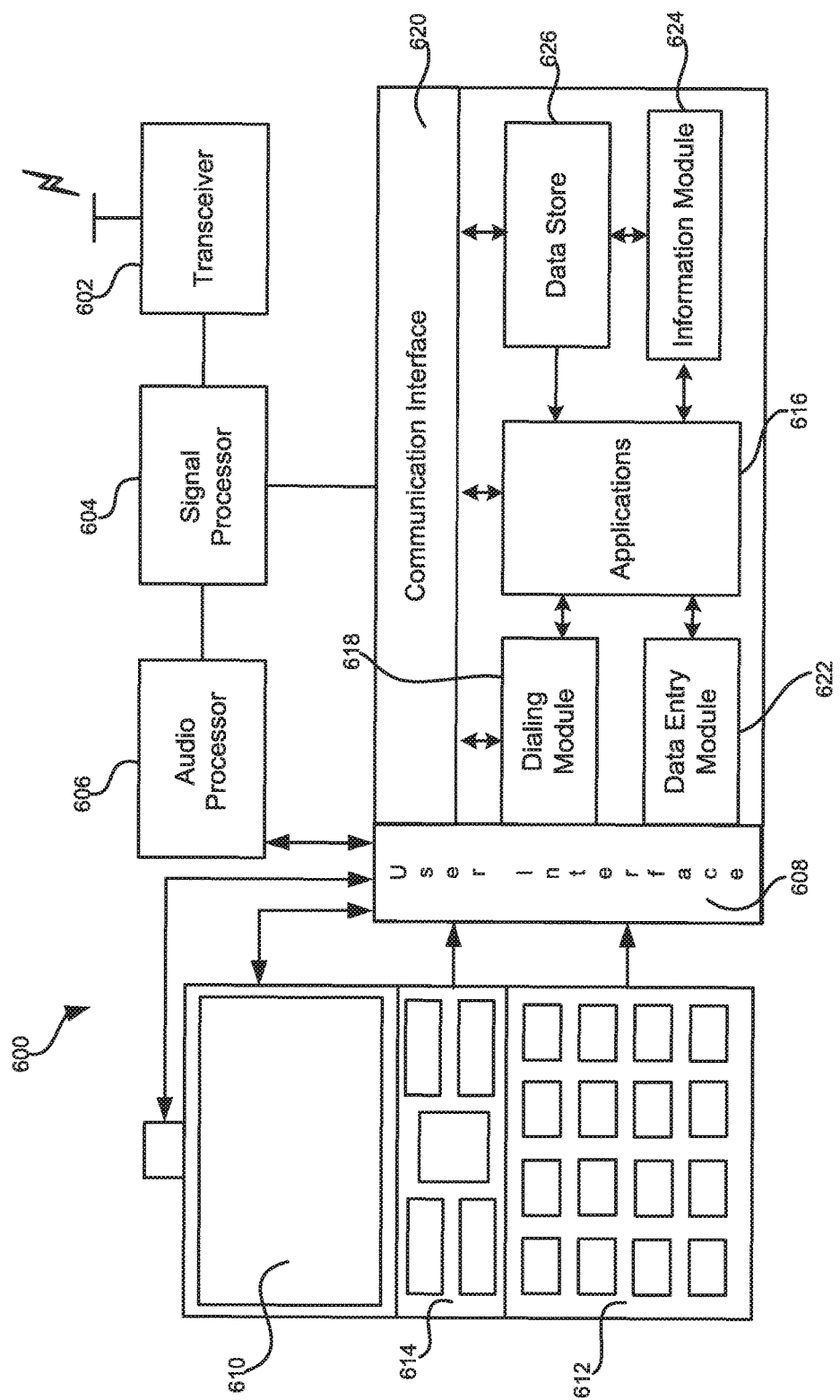
FIG. 6 is a schematic diagram of a wireless communication handset for generating requests and receiving user information.

FIG. 6 is a schematic diagram of a communication system 600. For example, the communication system 600 may be implemented in the mobile device 512 of FIG. 5. The system 600 receives and transmits information wirelessly using a transceiver 602, with the received signals being passed to a signal processor 604. The signal processor 604 can include digital signal processing (DSP) circuitry for processing the received signals. Normal voice communication can be routed to or from audio processor 606.

As shown, the audio processor 606 communicates with a user interface 608. The user interface 108 handles communications between the user and the system 600, such as voice, visual, and data entry communication. Visual presentation of information may be provided via a display screen 610. General data entry, apart from the entered voice data, may occur through a keypad 612. In the depicted example, the keypad 612 is arranged as a standard 12-key telephone keypad. In other examples, the keypad 612 can be a touch screen or a keypad having other layout, such as a standard "qwerty" keyboard layout. The system 600 also includes appropriate control keys 614 for performing control functions. In some examples, the keypad 612 and the control keys 614 may include contact push-buttons, joysticks, portions of touch-sensitive panels, or other appropriate input devices. Although the communications are shown for clarity as occurring through a single user interface 608, multiple interfaces may be used, and may be combined with other components.

The system 600 includes a number of computer applications 616, such as games, applications to assist in dialing numbers, and applications to permit web browsing, including the entry of data as part of the web browsing. The applications 616 may be stored in ROM, Flash memory, RAM, MRAM, or other memory device accessible by the system 600. The system 600 includes a dialing module 618 to provide standard dialing functionalities for the system 600. After receiving entered dialing digits or voice dialing instructions through the interface 608, the dialing module 618 may, for example, transmit dial signals through the transceiver 602 via a communication interface 620.

In some implementations, the applications 616 can include a voice recognition application. For example, the voice recognition application is configured to convert voice signals (e.g., the user's voice communication) received from the user interface 608 into digital data. In some examples, the IPS 502 can use the digital data to determine a user preference.

A data entry module 622 may operated on data received via the transceiver 602. For example, the received data may be search results requested by a user of the system 600. In another example, the received data may be target information presented by the IPS 502. The data entry module 622 can pass the entered data to one of the applications 616. In some implementations, the application 616 can display the target information on the display 610. In some implementations, the application 616 can display an icon to represent that target information has been received and is available for display. For example, the user may select one of the control keys 614 to display the target information.

In some implementations, the system 600 uses an information module 624 to manage the target information. For example, the information module 624 can determine a time to present the target information. In some implementations, the information module 624 may periodically request target information to be downloaded to the system 600. In various implementations, the received data or information from the system 502 of FIG. 5 may include display commands that instruct when to deliver the content (e.g., by displaying on display 610) to the user. In some implementations, the information module 624 may itself determine when to present the information, and may do so in response to a user-initiated interaction with the mobile device.

In some examples, the downloaded target information may be stored in a data store 626. The data store 626 may be a dedicated memory device, or may be one or more blocks of memory in a shared memory space. For example, the data store 626 may be, for example, RAM, Flash memory, ROM, MRAM, or other appropriate memory technologies.

In certain implementations, the downloaded target information may include presentation instructions, such as a time for presenting the information. In some implementations, the information module 624 is configured to present the target information based on presentation instructions specified with the target information. For example, the system 600 may receive target information with instructions that the information be displayed at a particular time (e.g., 7:32 p.m. on May 8, 2008), or in response to a particular user action (e.g., when the user indicates an interest in particular subject matter, observable based on the user's interaction with the mobile device). The information module 624 can store the target information in the data store 626. At the appropriate time, the information module 624 retrieves the stored target information and presents the target information to the user.

Figure 7:
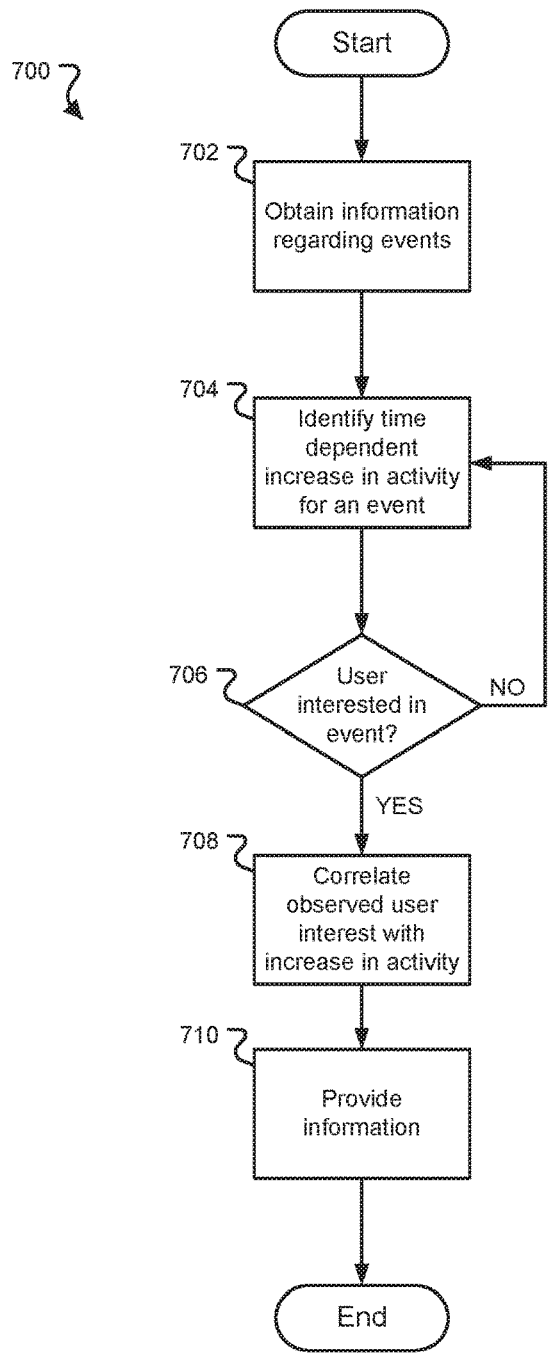
FIG. 7 is a flow chart of an exemplary method that can be performed by a system for presenting time-related information.

FIG. 7 is a flow chart of an exemplary method 700 that can be performed by a system for presenting time-related information. At step 702, information regarding events is obtained. Such information may be based on user interaction with a mobile device. Search requests, information requests, communications, selections, and the event, activity, or subject matter they pertain to, are examples of information that may be obtained. At step 704, a time dependent increase in activity for an event may be identified. Such an increase in activity may take several forms. For example, the increase may include observation of a predetermined number of events within a predetermined period of time. As another example, the increase may include an increase in activity of a predetermined percentage over a period of time as compared to the percentage of activity over a previous period of time. The increase in activity may be based on actions of other users. For example, the system may notice an increase in movie-related-information-seeking activity in the month leading up to the Oscars award show.

If a user has not indicated interest in the event at step 706, the process returns to step 704. If, however, the user has indicated an interest in the event at step 706, the observed interest is correlated with an identified increase in activity for the event at step 708. Whether or not a user has demonstrated an interest in the event may be determined by examining stored user behavior data, for example, which may include indications of interest the user has expressed via interactions with the user's mobile device, for example. Indications may also be determined using location-based information, as another example. A user's interest level may be scored, where the score indicates a level of interest. For example, if the user has indicated interest in an event on multiple occasions, the user may have greater interest in the event than if the user has indicated an interest only once. Similarly, if the user has indicated interest over a period of time, perhaps in a regular or semi-regular fashion, this may be indicative of a higher level of user interest in the event. Increases in user activity can also be used in the correlation. Increases can include observing a predetermined number of user indications over a period of time, including a percentage-increase over a period of time as compared to an earlier period, or extension of a pattern of behavior, such as observing an indication of interest on a third consecutive day (extending the pattern from the observed behavior on the first two consecutive days, e.g.).

At step 710, information is provided to the user, as by providing the information for review at the user's mobile device, and the method 700 ends. For example, target information can be provided related to a current user interest and the event. The information may be provided at a time that is predicted to correspond to a time that the user may be especially interested in receiving the information, which time may be determined using the prediction techniques disclosed herein. For example, patterns of user behavior, whether regular or semi-regular, may be observed and predictions of future user behavior may be determined. In some cases, the predictions can also be based on external signals, such as information retrieved from storage locations or from other computing devices, where the information does not involve past behavior of the user.

Figure 8:
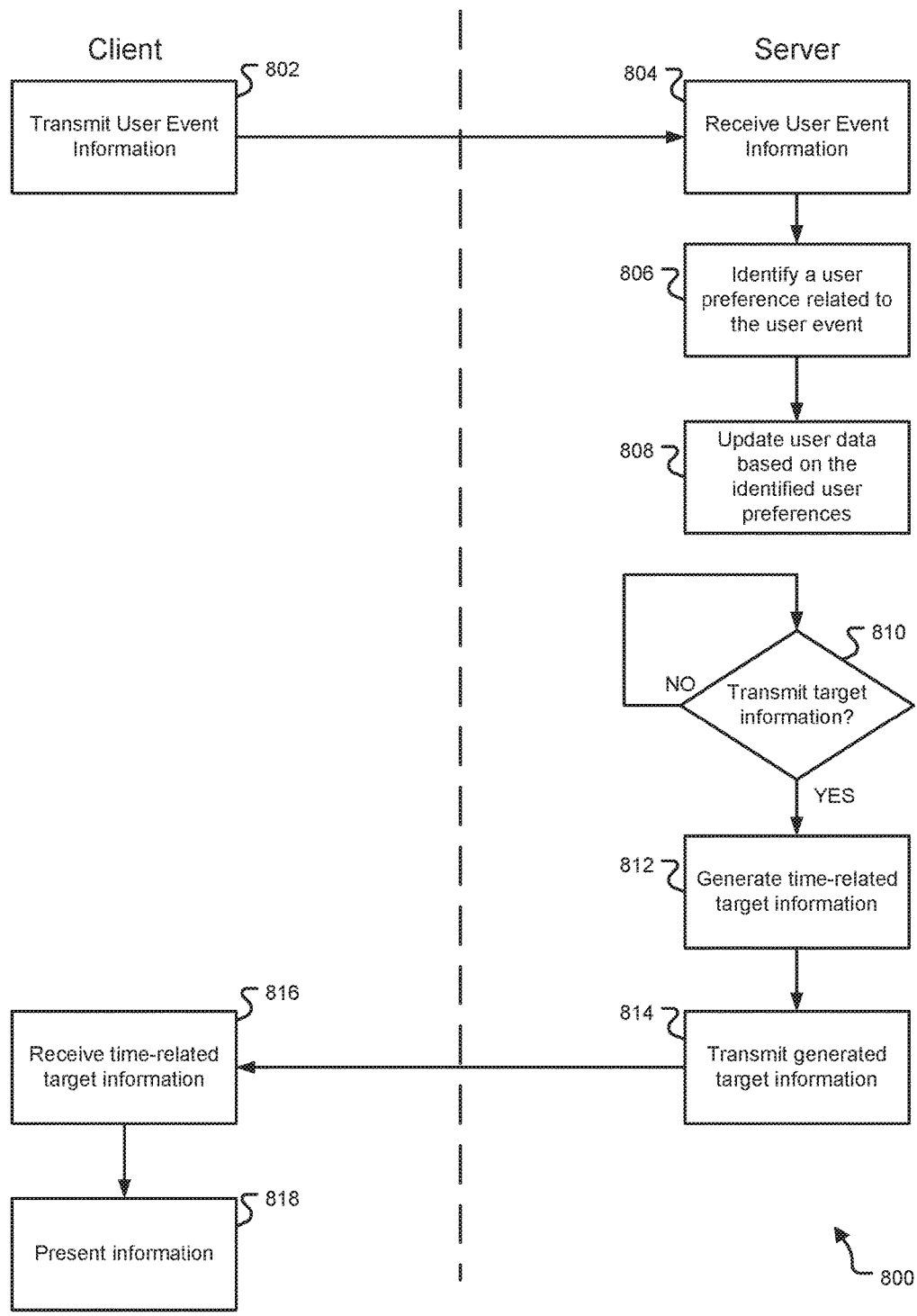
FIG. 8 shows example operations between a client and a server to provide time-related target information.

FIG. 8 shows example operations 800 between a client and a server to provide time-related target information. At step 802, a client device, such as a mobile phone, smartphone, or PDA, transmits user event information to a server. User event information, such as transaction information, information requests, location information, communication information, and the like may be transmitted in this fashion, such as over a communication network. At step 804, the server receives the user event information. After receiving the user event information, the server can identify a user preference related to the user event at step 806. For example, the user preference for buying coffee on weekday mornings based on frequency information (e.g., a purchasing pattern) and time information (e.g., purchasing time) may be identified.

After identifying the user preferences related to the user event, the server updates user data based on the identified user preferences at step 808. Such information can be stored in a digital storage location, for example, and can supplement information that comprises a profile for the user, which may be developed over time by the server for use in making predictions of future user behavior. At step 810, the server determines whether target information is to be transmitted to the client. For example, a prediction module may determine a time related to a user preference. As an example, the prediction module can determine that the user may attend the local baseball team's next-scheduled home game at the stadium based on a pattern of observed user activity. The prediction module may obtain the team's schedule, determine the next home game, and determine an appropriate time for information delivery. In some implementations, the determined time associated with a predicted event can be scheduled and stored in a data repository. A scheduling program may then manage delivery schedules so that the time-dependent information may be delivered at appropriate times.

If no information stored is related to the user preference of the current time, then the step 810 is repeated. If some information stored is related to the user preference of the current time, then the server generates time-related target information at step 812. After generating the time-related target information, the generated target information is transmitted to the client at step 814. Such information can be transmitted, for example, over a communication network.

The client device may receive the information at step 816. The client can provide the information for user review at step 818. In some cases, the client may provide the information for review upon receiving the information. In other cases, the client will provide the information for review at a scheduled time, often some time following receipt of the information. In yet other cases, the client can provide the information in response to an action by the user, as opposed to at a particular time independent of user action following receipt of the information. In this case, the client may receive the information and wait for a particular response from the user (e.g., selecting a key on the device), before presenting the information to the user. In some cases, the user response may indicate that the user is not interested in the information, in which case the information may not be presented. As examples of the scenarios just described, the user can accept (e.g., select to view the presented information) or reject to review the information. In some implementations, if the user rejects the information, the server can update the user data to adjust an indication of user interest of the presented information. In some examples, the adjustment can decrease a probability of presenting the information or similar information to the user in the future.

Similarly, user response to presented information may be tracked and used to update user profile information. These adjustments may guide future predictive determinations and information delivery. For example, if the user redeems a presented coupon, such system may be more likely to present similar coupons in the future. In various implementations, the operations described above can be combined or separated in various manners, more or fewer operations may be executed, and operations may occur at either the client or the server, e.g.

In any of the implementations described above, the period for observing user activity or global activity may be a definite period or an indefinite period. For example, the system may be programmed to capture data for one week and then stop capturing data. Alternatively, data may be gathered until a recurring or semi-recurring pattern begins to show in the data. In such a case, a minimum collection period may be established, such as one week, one month, etc., so that the system does not stop gathering data prematurely if by coincidence events are observed and thought to constitute a pattern. Maximum periods may similarly be established.

The presence or absence of commonality may be determined at various levels of granularity. For example, if several instances of an event have been observed, a point may be considered "common" if it is common to a particular percentage of the instances. As an example, if the user stops for coffee each morning Monday through Friday during a first week, but skips stopping for coffee on Friday of the second week, the system may yet predict that the user will stop for coffee on each future workday. In this fashion, the incidence of the skipped day may be considered an aberration, not worthy of altering the predictive schedule developed based on the observed user activity. On the other hand, if the user begins repeatedly skipping the morning coffee stop, the system may determine that the user's behavior activity is changing, and may adjust predictive determinations and information delivery accordingly.

Nested or overlapping patterns may also be observed. For example, on top of the pattern of stopping for coffee each weekday, a pattern of purchasing a particular delicacy on particular days may be determined based on transaction records. As another example, the user may typically purchase a newspaper each Friday to get an early look at happenings during the upcoming weekend, or may purchase a paper on Monday mornings during the football season to check the statistics of his fantasy football team. The papers may be purchased, e.g., at the coffee shop or from a street-side news vendor or distribution box near the coffee shop. If the user decides to go on a health kick and swear off caffeine, including abstaining from coffee, such newspaper purchases may be expected to similarly diminish in frequency of occurrence.

Figure 9:
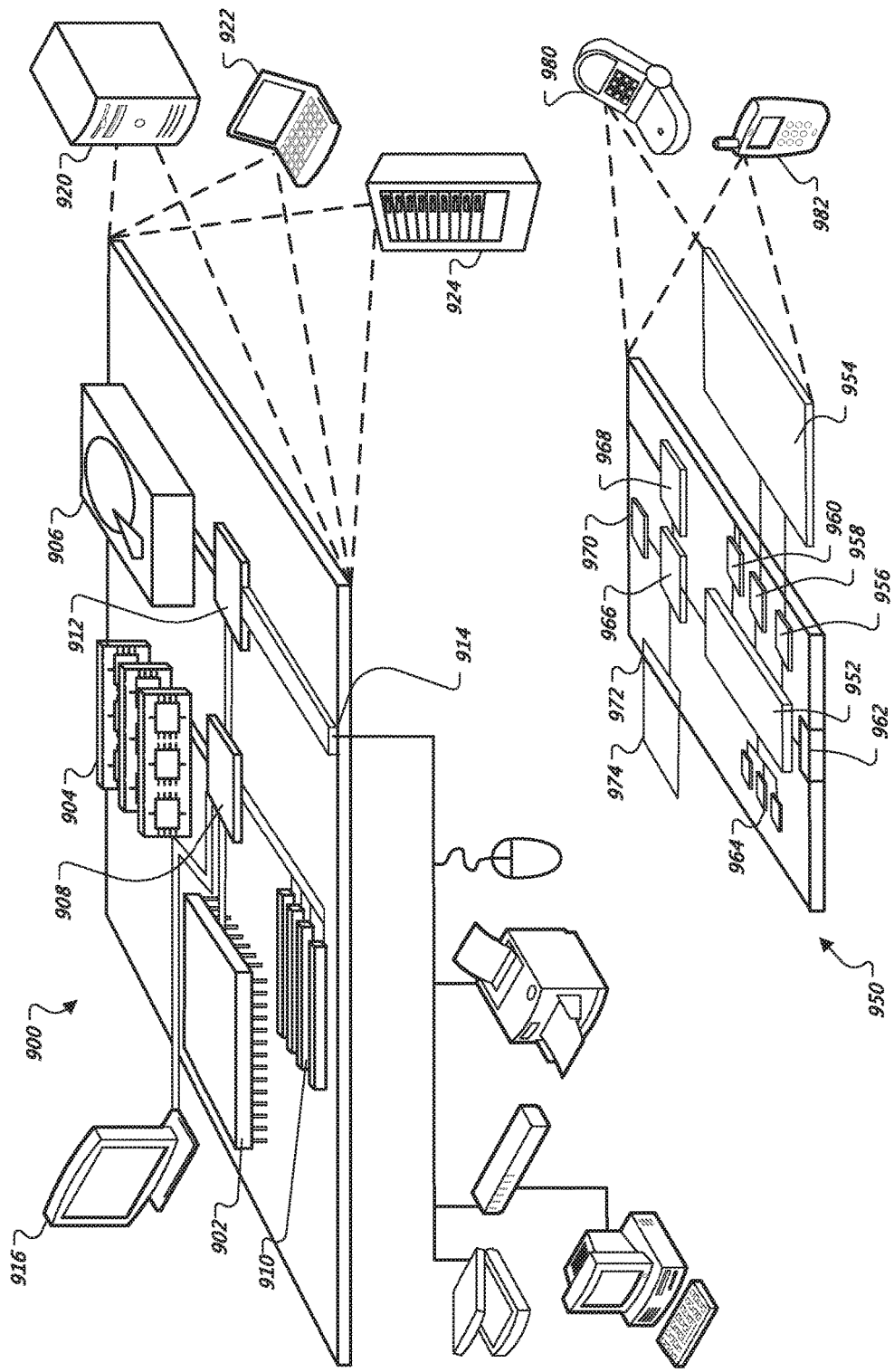
FIG. 9 shows an example of a generic computer device and a generic mobile computer device.

FIG. 9 shows an example of a generic computer device 900 and a generic mobile computer device 950. In various implementations, the devices may be used to implement the systems and methods described in this document. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the systems, methods, devices or techniques described and/or claimed in this document.

Computing device 900 includes a processor 902, memory 904, a storage device 906, a high-speed interface 908 connecting to memory 904 and high-speed expansion ports 910, and a low speed interface 912 connecting to a low speed bus or port 914 and storage device 906. Each of the components 902, 904, 906, 908, 910, and 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a computer-readable medium. In one implementation, the memory 904 is a volatile memory unit or units. In another implementation, the memory 904 is a non-volatile memory unit or units.

The storage device 906 is capable of providing mass storage for the computing device 900. In one implementation, the storage device 906 is a computer-readable medium. In various implementations, the storage device 906 may be a floppy disk device, a hard disk device, an optical disk device, a tape device, a flash memory or other similar solid-state memory device, or an array of devices, including devices in a storage area network or other configurations. In one implementation, a computer program product is tangibly embodied in an information carrier. In an implementation, the computer program product may be stored on a computer-readable medium, including those discussed above. The computer program product contains instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower-bandwidth-intensive operations. Such allocation of duties is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 952, 964, 954, 966, and 968 are interconnected using various busses, and several of the components may be mounted on a common motherboard or in other manners as appropriate.

The processor 952 can process instructions for execution within the computing device 950, including instructions stored in the memory 964. The processor may also include separate analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to the display 954. The display 954 may be, for example, a TFT LCD display or an OLED display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near-area communication of device 950 with other devices. External interface 962 may provide, for example, for wired communication (e.g., via a docking procedure) or for wireless communication (e.g., via Bluetooth or other such technologies).

The memory 964 stores information within the computing device 950. In one implementation, the memory 964 is a computer-readable medium. In one implementation, the memory 964 is a volatile memory unit or units. In another implementation, the memory 964 is a non-volatile memory unit or units. Expansion memory 974 may also be provided and connected to device 950 through expansion interface 972, which may include, for example, a SIMM card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal.

Device 950 may communicate wirelessly through communication interface 966, which may include digital signal processing circuitry as appropriate. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS receiver module 970 may provide additional wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile devices.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems, devices and techniques described here can be implemented on a computer having a display device (e.g., a CRT (cathode ray tube) or LCD (liquid crystal display) monitor) for displaying information to the user and a keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems, devices and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. It will be appreciated that any appropriate time interval may be used to make the determinations described above, and that the determinations may be made using any appropriate number of data points within the time interval. Accordingly, other implementations are within the scope of the following claims.

What is claimed is:

1. A computer-implemented method, comprising:
receiving, by a computing system and from a mobile computing device, first information that indicates that a user has engaged in one or more user-performed activities, the first information including time information indicating when the one or more user-performed activities were performed and location information indicating a location of the mobile computing device;
receiving, by the computing system from one or more servers, second information including a schedule of times for multiple occurrences of an event;
determining, by the computing system, that the user likely participated in multiple previous occurrences of the event by comparing the first information to the second information to determine that the user engaged in the one or more user-performed activities at or near times at which the previous occurrences of the event were identified to have occurred according to the schedule of times, which was included as part of the second information;
identifying, by the computing system, a time at which a future occurrence of the event is scheduled to occur according to the schedule of times, which was included as part of the second information;
predicting, by the computing system, that the user is likely to participate in the future occurrence of the event based on the computing system having determined that the user likely participated in the multiple previous occurrences of the event; and
transmitting, from the computing system to the mobile computing device, instructions that, when executed by the mobile computing device, cause the mobile computing device to present a visual alert to the user of the mobile computing device at a time before the future occurrence of the event, wherein the instructions are transmitted in response to the computing system having determined that the user is likely to participate in the future occurrence of the event, and wherein the visual alert includes information that relates to a product or service that is: 1) associated with the future occurrence of the event; or 2) available for purchase at a location at or near a location for the future occurrence of the event;
wherein the information that relates to the product or service includes information to redeem an offer that relates to and identifies the product or service that can be communicated from the mobile computing device to a computing device at a place of business at which the product or service is offered for purchase to allow redemption of the offer that relates to and identifies the product or service.

2. The computer-implemented method of claim 1, wherein the first information includes GPS information received from the mobile computing device of the user, the GPS information indicating that the user traveled, at the times at which the previous occurrences of the event were identified to have occurred according to the schedule, to a geographic location at which the multiple previous occurrences of the event were identified as having occurred.

3. The computer-implemented method of claim 1, wherein the first information includes query information entered by the user into the mobile computing device, the query information indicating that the user submitted, at the times at which the previous occurrences of the event were identified as having occurred according to the schedule, a query that identifies the event.

4. The computer-implemented method of claim 1, wherein the first information includes purchase information indicating that the user purchased products at times at which the multiple previous occurrences of the event were identified as having occurred according to the schedule and at a geographic location at which the multiple previous occurrences of the event were identified to have occurred.

5. The computer-implemented method of claim 1, wherein:
the event is a sporting event,
the multiple previous occurrences of the event are individual games of the sporting event on different days, and
determining that the user likely participated in the multiple previous occurrences of the event includes determining that the user likely attended each of the individual games of the sporting event by traveling to one or more locations at which the individual games of the sporting event were played.

6. The computer-implemented method of claim 1, wherein the event is an airing of a television show, and the multiple previous occurrences of the event are individual episodes of the television show.

7. The computer-implemented method of claim 1, further comprising scheduling a time at which the visual alert is to be provided for presentation to the user; wherein the visual alert is presented to the user by the mobile computing device at the scheduled time.

8. The computer-implemented method of claim 1, wherein the information that relates to the product or service includes a promotion for a venue that is in a geographical vicinity of another venue at which the future occurrence of the event is to occur.

9. The computer-implemented method of claim 1, wherein the information that relates to the product or service includes a promotion for an item that the user is able to purchase from a venue at which the future occurrence of the event is to occur.

10. The computer-implemented method of claim 1, wherein the information that relates to the product or service is provided for presentation to the user without the user having submitted a request that the computing system provide the information at the time that is before the future occurrence of the event.

11. A non-transitory computer-readable medium having instructions encoded thereon, which, when executed by one or more processors, cause performance of operations that comprise:
receiving, by a computing system and from a mobile computing device, first information that indicates that a user has engaged in one or more user-performed activities, the first information including time information indicating when the one or more user-performed activities were performed and location information indicating a location of the mobile computing device;
receiving, by the computing system from one or more servers, second information including a schedule of times for multiple occurrences of an event;
determining, by the computing system, that the user likely participated in multiple previous occurrences of the event by comparing the first information to the second information to determine that the user engaged in the one or more user-performed activities at or near times at which the previous occurrences of the event were identified to have occurred according to the schedule of times, which was included as part of the second information;
identifying, by the computing system, a time at which a future occurrence of the event is scheduled to occur according to the schedule of times, which was included as part of the second information;
predicting, by the computing system, that the user is likely to participate in the future occurrence of the event based on the computing system having determined that the user likely participated in the multiple previous occurrences of the event; and
transmitting, from the computing system to the mobile computing device, instructions that, when executed by the mobile computing device, cause the mobile computing device to present a visual alert to the user of the mobile computing device at a time before the future occurrence of the event, wherein the instructions are transmitted in response to the computing system having determined that the user is likely to participate in the future occurrence of the event, and wherein the visual alert includes information that relates to a product or service that is: 1) associated with the future occurrence of the event; or 2) available for purchase at a location at or near a location for the future occurrence of the event;
wherein the information that relates to the product or service includes information to redeem an offer that relates to and identifies the product or service that can be communicated from the mobile computing device to a computing device at a place of business at which the product or service is offered for purchase to allow redemption of the offer that relates to and identifies the product or service.

12. The computer-readable medium of claim 11, wherein the first information includes GPS information received from the mobile computing device of the user, the GPS information indicating that the user traveled, at the times at which the previous occurrences of the event were identified to have occurred according to the schedule, to a geographic location at which the multiple previous occurrences of the event were identified as having occurred.

13. The computer-readable medium of claim 11, wherein the first information includes query information entered by the user into the mobile computing device, the query information indicating that the user submitted, at the times at which the previous occurrences of the event were identified as having occurred according to the schedule, a query that identifies the event.

14. The computer-readable medium of claim 11, wherein the first information includes purchase information indicating that the user purchased products at times at which the multiple previous occurrences of the event were identified as having occurred according to the schedule and at a geographic location at which the multiple previous occurrences of the event were identified to have occurred.

15. The computer-readable medium of claim 11, wherein:
the event is a sporting event,
the multiple previous occurrences of the event are individual games of the sporting event on different days, and
determining that the user likely participated in the multiple previous occurrences of the event includes determining that the user likely attended each of the individual games of the sporting event by traveling to one or more locations at which the individual games of the sporting event were played.

16. The computer-readable medium of claim 11, wherein the event is an airing of a television show, and the multiple previous occurrences of the event are individual episodes of the television show.

17. The computer-readable medium of claim 11, further comprising scheduling a time at which the visual alert is to be provided for presentation to the user; wherein the visual alert is presented to the user by the mobile computing device at the scheduled time.

18. The computer-readable medium of claim 11, wherein the information that relates to the product or service includes a promotion for a venue that is in a geographical vicinity of another venue at which the future occurrence of the event is to occur.

19. The computer-readable medium of claim 11, wherein the information that relates to the product or service includes a promotion for an item that the user is able to purchase from a venue at which the future occurrence of the event is to occur.

20. The computer-readable medium of claim 11, wherein the information that relates to the product or service is provided for presentation to the user without the user having submitted a request that the computing system provide the information at the time that is before the future occurrence of the event.

* * * * *